United States Patent
Gao

(10) Patent No.: US 11,665,734 B2
(45) Date of Patent: May 30, 2023

(54) METHOD FOR PROCESSING UPLINK CONTROL INFORMATION, TERMINAL AND BASE STATION

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/635,541

(22) PCT Filed: Aug. 4, 2020

(86) PCT No.: PCT/CN2020/106783
§ 371 (c)(1),
(2) Date: Feb. 15, 2022

(87) PCT Pub. No.: WO2021/027627
PCT Pub. Date: Feb. 18, 2021

(65) Prior Publication Data
US 2022/0217739 A1    Jul. 7, 2022

(30) Foreign Application Priority Data
Aug. 15, 2019    (CN) .......................... 201910755210.4

(51) Int. Cl.
*H04W 72/566*    (2023.01)
*H04L 1/1812*    (2023.01)
(Continued)

(52) U.S. Cl.
CPC ......... *H04W 72/566* (2023.01); *H04L 1/1812* (2013.01); *H04L 5/0053* (2013.01);
(Continued)

(58) Field of Classification Search
CPC ......... H04W 72/1247; H04W 72/0413; H04W 72/0446; H04W 72/1231; H04W 72/1284; H04L 1/1812; H04L 5/0053
(Continued)

(56) References Cited

U.S. PATENT DOCUMENTS

2019/0261361 A1\*    8/2019    Xiong .................... H04W 72/02
2019/0261391 A1\*    8/2019    Kundu .............. H04W 72/0446
(Continued)

FOREIGN PATENT DOCUMENTS

CN    109155726 A    1/2019
CN    109996337 A    7/2019
(Continued)

OTHER PUBLICATIONS

Written Opinion and International Search Report for International application No. PCT/CN2020/106783 dated Sep. 29, 2020.
(Continued)

*Primary Examiner* — Chi Tang P Cheng
(74) *Attorney, Agent, or Firm* — Harness, Dickey & Pierce, P.L.C.

(57) ABSTRACT

A method for processing uplink control information, a terminal and a base station are provided. The method includes: when a first Physical Uplink Control Channel (PUCCH) resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain, discarding a first target UCI when a fourth PUCCH resource for simultaneously transmitting the second UCI and the third UCI is overlapped with the first PUCCH resource, the first target UCI is one of the second UCI and the third UCI.

20 Claims, 4 Drawing Sheets

--- when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: dropping a first target UCI if a fourth PUCCH resource for simultaneously transmitting the second UCI and the third UCI is overlapped with the first PUCCH resource; where the first target UCI is one of second UCI and the third UCI

11

(51) Int. Cl.
*H04L 5/00* (2006.01)
*H04W 72/0446* (2023.01)
*H04W 72/21* (2023.01)
*H04W 72/542* (2023.01)

(52) U.S. Cl.
CPC ....... *H04W 72/0446* (2013.01); *H04W 72/21* (2023.01); *H04W 72/542* (2023.01)

(58) Field of Classification Search
USPC .......................................................... 370/329
See application file for complete search history.

(56) References Cited

U.S. PATENT DOCUMENTS

| | | | |
|---|---|---|---|
| 2020/0008227 | A1 | 1/2020 | Lee et al. |
| 2020/0068599 | A1* | 2/2020 | Yang ................ H04L 5/0055 |
| 2020/0344788 | A1 | 10/2020 | Li et al. |
| 2020/0344789 | A1 | 10/2020 | Gao |
| 2020/0403735 | A1 | 12/2020 | Zhao |

FOREIGN PATENT DOCUMENTS

| | | |
|---|---|---|
| CN | 110035535 A | 7/2019 |
| EP | 3927064 A1 | 12/2021 |
| EP | 4007405 A1 | 6/2022 |
| WO | WO-2018/174450 A1 | 9/2018 |

OTHER PUBLICATIONS

Lenovo, Motorola Mobility, "Multiplexing of different UCI types", Agenda Item 7.1.3.2.2, 3GPP TSG RAN WG1 Meeting #92bis, R1-1804212, Apr. 16-20, 2018, Sanya, China.

Extended European Search Report dated Sep. 20, 2022 for Application No. EP 20851500.7.

Huawei, Hisilicon, "Remaining issues for physical uplink control channel", Agenda Item 7.1.3.2, 3GPP TSG RAN WG1 Meeting #94bis, R1-1810110, Oct. 8-12, 2018 Chengdu, China.

Huawei, Hisilicon, "Handling of PUCCH transmission with partial overlap", Agenda Item 7.1.3.2.5, 3GPP TSG RAN WG1 Meeting #92, R1-1802690, Feb. 26-Mar. 2, 2018, Athens, Greece.

* cited by examiner when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: dropping a first target UCI if a fourth PUCCH resource for simultaneously transmitting the second UCI and the third UCI is overlapped with the first PUCCH resource; where the first target UCI is one of second UCI and the third UCI /11

FIG. 1 when the first PUCCH resource is not overlapped with the second PUCCH resource in the time domain, the first PUCCH resource is not overlapped with the third PUCCH resource in the time domain, and the second PUCCH resource and the third PUCCH resource are overlapping in the time domain: determining a fourth PUCCH resource for simultaneously transmitting the second UCI and the third UCI according to a predefined multiplexing transmission rule /21 judging whether the fourth PUCCH resource and the first PUCCH resource are overlapped in the time domain /22 dropping a first target UCI if a fourth PUCCH resource for simultaneously transmitting the second UCI and the third UCI is overlapped with the first PUCCH resource; where the first target UCI is one of second UCI and the third UCI /23

FIG. 2

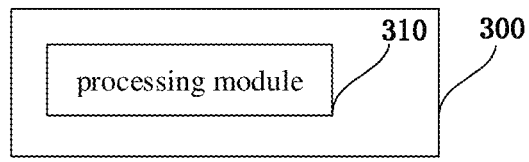

FIG. 3

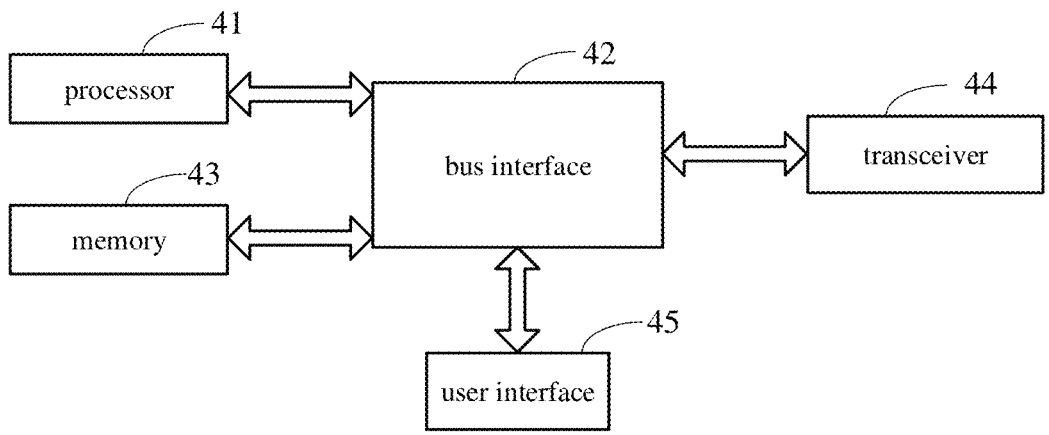

FIG. 4 when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: determining that a first target UCI is dropped if a fourth PUCCH resource for simultaneously transmitting the second UCI and the third UCI is overlapped with the first PUCCH resource; where the first target UCI is one of second UCI and the third UCI ⟋ 51

FIG. 5 when the first PUCCH resource is not overlapped with the second PUCCH resource in the time domain, the first PUCCH resource is not overlapped with the third PUCCH resource in the time domain, and the second PUCCH resource and the third PUCCH resource are overlapped in the time domain: determining a fourth PUCCH resource for simultaneously transmitting the second UCI and the third UCI according to a predefined multiplexing transmission rule  — 61 judging whether the fourth PUCCH resource and the first PUCCH resource are overlapped in the time domain  — 62 determining that a first target UCI is dropped if a fourth PUCCH resource for simultaneously transmitting the second UCI and the third UCI is overlapped with the first PUCCH resource; where the first target UCI is one of second UCI and the third UCI  — 63

FIG. 6

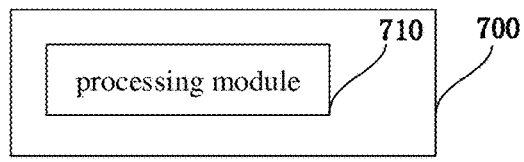

FIG. 7

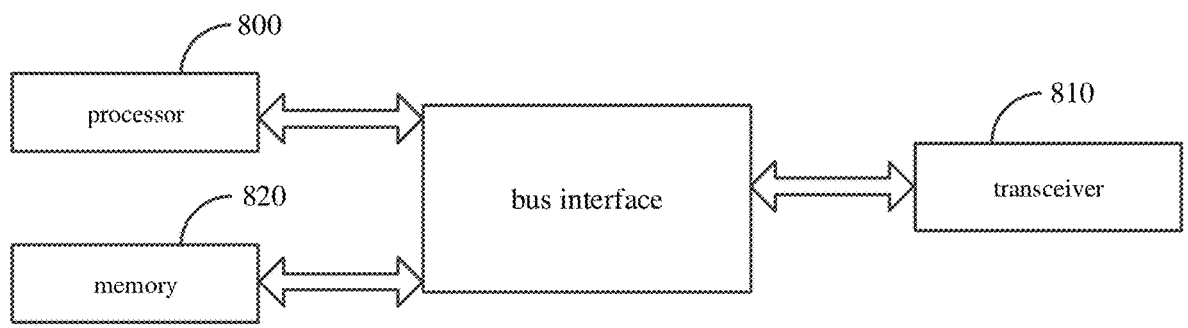

FIG. 8

METHOD FOR PROCESSING UPLINK CONTROL INFORMATION, TERMINAL AND BASE STATION

CROSS REFERENCE OF RELATED APPLICATION

Cross-Reference to Related Applications

The present application is the U.S. national phase of PCT Application PCT/CN2020/106783 filed on Aug. 4, 2020, which claims a priority of Chinese patent application No. 201910755210.4 filed on Aug. 15, 2019, which is incorporated herein by reference in its entirety.

TECHNICAL FIELD

The present disclosure relates to the field of communications technologies, and in particular, to a method for processing uplink control information, a terminal and a base station.

BACKGROUND

In a New air interface (5th-Generation New Radio, 5G NR) of the fifth Generation mobile communication technology, Hybrid automatic repeat request acknowledgment (HARQ-ACK) information transmission is supported in a slot based on a sub-slot, and is used for supporting feedback information transmission of Ultra-Reliable and Low Latency communication (URLLC) services to reduce transmission delay. When a terminal supports multiple services, for example, supports URLLC and enhanced Mobile Broadband (eMBB) services at the same time, a situation may occur that Physical Uplink Control Channel (PUCCH) resources carrying Uplink Control Information (UCI) of different services overlap in a time domain. When PUCCH resources for carrying UCI of different services overlap in the time domain, there is no specific transmission scheme.

SUMMARY

The present disclosure provides a method for processing uplink control information, a terminal and a base station, which solve the problem in the related art that no specific transmission scheme exists when PUCCH resources for carrying UCI different services overlap in a time domain.

In a first aspect, a method of processing uplink control information (UCI) is provided in the present disclosure, performed by a terminal and including:

when a first Physical Uplink Control Channel (PUCCH) resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain, dropping a first target UCI when a fourth PUCCH resource for simultaneously transmitting the second UCI and the third UCI is overlapped with the first PUCCH resource; the first target UCI is one of the second UCI and the third UCI.

Optionally, the method further includes:

when the first PUCCH resource is not overlapped with the second PUCCH resource in the time domain, the first PUCCH resource is not overlapped with the third PUCCH resource in the time domain, and the second PUCCH resource is overlapped with the third PUCCH resource in the time domain, determining the fourth PUCCH resource for simultaneously transmitting the second UCI and the third UCI according to a predefined multiplexing transmission rule; and judging whether the fourth PUCCH resource and the first PUCCH resource are overlapped in the time domain.

Optionally, the dropping the first target UCI includes:

when the first UCI is Scheduling Request (SR) information, if a positive SR information transmission exists, dropping the first target UCI.

Optionally, the first target UCI is a UCI with a lower priority in the second UCI and the third UCI; or when one of the second UCI and the third UCI is channel state information (CSI), the first target UCI is one of the second UCI and the third UCI which is CSI; or when the second UCI and the third UCI are both CSI and the priorities of the second UCI and the third UCI are the same, the first target UCI is a predetermined one or any one of the second UCI and the third UCI; or the first target UCI is the third UCI.

Optionally, the UCI with the lower priority is: UCI with a lower UCI priority, UCI corresponding to a lower priority level, UCI corresponding to an enhanced mobile broadband (eMBB) service, or UCI corresponding to a lower priority service.

Optionally, the first UCI is at least one of SR information, CSI or hybrid automatic repeat request-acknowledgment (HARQ-ACK) information;

the second UCI is at least one of SR information, CSI or HARQ-ACK information;

the third UCI is at least one of SR information, CSI or HARQ-ACK information.

Optionally, a priority of the first UCI is higher than or equal to a priority of the third UCI; a priority of the second UCI is higher than or equal to the priority of the third UCI; the first UCI and the second UCI correspond to the same or different priorities;

the priority is: a corresponding UCI priority, or a corresponding priority level, or a corresponding service type, or a corresponding priority of service type.

Optionally, dropping the first target UCI when the fourth PUCCH resource for simultaneously transmitting the second UCI and the third UCI is overlapped with the first PUCCH resource when the first PUCCH resource carrying first UCI and the second PUCCH resource carrying second UCI are not overlapped in the time domain, the first PUCCH resource is not overlapped with the third PUCCH resource carrying third UCI in the time domain, and the second PUCCH resource and the third PUCCH resource are overlapped in the time domain includes at least one of:

when the first UCI is SR or a first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, dropping the second CSI;

when the first UCI is SR or a first HARQ-ACK or CSI, the second UCI is a second HARQ-ACK, and the third UCI is a third HARQ-ACK, if PUCCH resources for simultaneously transmitting the second HARQ-ACK and the third HARQ-ACK are overlapped with PUCCH resources for carrying the SR or the first HARQ-ACK or CSI, dropping the third HARQ-ACK, where a priority of the third HARQ- ACK is lower than a priority of the second HARQ-ACK, and the priority of the third HARQ-ACK is lower than a priority of the first UCI;

when the first UCI is a first SR or a first HARQ-ACK or CSI, the second UCI is a second HARQ-ACK, and the third UCI is a second SR, if PUCCH resources for simultaneously transmitting the second HARQ-ACK and the second SR are overlapped with PUCCH resources for transmitting the first SR or the first HARQ-ACK or CSI, dropping the second SR, where a priority of the second SR is lower than or equal to a priority of the second HARQ-ACK, and the priority of the second SR is lower than or equal to a priority of the first UCI;

when the first UCI is SR or HARQ-ACK or first CSI, the second UCI is second CSI and the third UCI is third CSI, if PUCCH resources for simultaneously transmitting the second CSI and the third CSI are overlapped with PUCCH resources for transmitting the SR or HARQ-ACK or the first CSI, dropping CSI with a lower priority in the second CSI and the third CSI, where a priority of the third CSI is lower than a priority of the second CSI; or when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and priorities of the second CSI and the third CSI are the same, dropping a predetermined one or any one of the second CSI and the third CSI.

In a second aspect, a terminal is further provided in the present disclosure, including: a transceiver, a memory, a processor, and a computer program stored in the memory and executable on the processor, where the processor is configured to execute the computer program to perform:

when a first Physical Uplink Control Channel (PUCCH) resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain, dropping a first target UCI when a fourth PUCCH resource for simultaneously transmitting the second UCI and the third UCI is overlapped with the first PUCCH resource;

the first target UCI is one of the second UCI and the third UCI.

Optionally, the processor is configured to execute the computer program to perform:

when the first PUCCH resource is not overlapped with the second PUCCH resource in the time domain, the first PUCCH resource is not overlapped with the third PUCCH resource in the time domain, and the second PUCCH resource is overlapped with the third PUCCH resource in the time domain, determining the fourth PUCCH resource for simultaneously transmitting the second UCI and the third UCI according to a predefined multiplexing transmission rule; and judging whether the fourth PUCCH resource and the first PUCCH resource are overlapped in the time domain.

Optionally, the processor is configured to execute the computer program to perform:

when the first UCI is Scheduling Request (SR) information, if a positive SR information transmission exists, dropping the first target UCI.

Optionally, the first target UCI is a UCI with a lower priority in the second UCI and the third UCI; or when one of the second UCI and the third UCI is channel state information (CSI), the first target UCI is one of the second UCI and the third UCI which is CSI; or when the second UCI and the third UCI are both CSI and the priorities of the second UCI and the third UCI are the same, the first target UCI is a predetermined one or any one of the second UCI and the third UCI; or the first target UCI is the third UCI.

Optionally, the UCI with the lower priority is: UCI with a lower UCI priority, UCI corresponding to a lower priority level, UCI corresponding to an enhanced mobile broadband (eMBB) service, or UCI corresponding to a lower priority service.

Optionally, the first UCI is at least one of SR information, CSI or hybrid automatic repeat request-acknowledgment (HARQ-ACK) information;

the second UCI is at least one of SR information, CSI or HARQ-ACK information;

the third UCI is at least one of SR information, CSI or HARQ-ACK information.

Optionally, a priority of the first UCI is higher than or equal to a priority of the third UCI; a priority of the second UCI is higher than or equal to the priority of the third UCI; the first UCI and the second UCI correspond to the same or different priorities;

the priority is: a corresponding UCI priority, or a corresponding priority level, or a corresponding service type, or a corresponding priority of service type.

Optionally, the processor is configured to execute the computer program to perform:

when the first UCI is SR or a first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, dropping the second CSI;

when the first UCI is SR or a first HARQ-ACK or CSI, the second UCI is a second HARQ-ACK, and the third UCI is a third HARQ-ACK, if PUCCH resources for simultaneously transmitting the second HARQ-ACK and the third HARQ-ACK are overlapped with PUCCH resources for carrying the SR or the first HARQ-ACK or CSI, dropping the third HARQ-ACK, where a priority of the third HARQ-ACK is lower than a priority of the second HARQ-ACK, and the priority of the third HARQ-ACK is lower than a priority of the first UCI;

when the first UCI is a first SR or a first HARQ-ACK or CSI, the second UCI is a second HARQ-ACK, and the third UCI is a second SR, if PUCCH resources for simultaneously transmitting the second HARQ-ACK and the second SR are overlapped with PUCCH resources for transmitting the first SR or the first HARQ-ACK or CSI, dropping the second SR, where a priority of the second SR is lower than or equal to a priority of the second HARQ-ACK, and the priority of the second SR is lower than or equal to a priority of the first UCI;

when the first UCI is SR or HARQ-ACK or first CSI, the second UCI is second CSI and the third UCI is third CSI, if PUCCH resources for simultaneously transmitting the second CSI and the third CSI are overlapped with PUCCH resources for transmitting the SR or HARQ-ACK or the first CSI, dropping CSI with a lower priority in the second CSI and the third CSI, where a priority of the third CSI is lower than a priority of the second CSI; or when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and priorities of the second CSI and the third CSI are the same, dropping a predetermined one or any one of the second CSI and the third CSI.

In a third aspect, a terminal is further provided in the present disclosure, including:

a processing module, configured to, when a first Physical Uplink Control Channel (PUCCH) resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain, drop a first target UCI when a fourth PUCCH resource for simultaneously transmitting the second UCI and the third UCI is overlapped with the first PUCCH resource;

the first target UCI is one of the second UCI and the third UCI.

In a fourth aspect, a method of processing uplink control information (UCI) is further provided in the present disclosure, performed by a base station and including:

when a first Physical Uplink Control Channel (PUCCH) resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain, determining that a first target UCI is dropped when a fourth PUCCH resource for simultaneously transmitting the second UCI and the third UCI is overlapped with the first PUCCH resource;

the first target UCI is one of the second UCI and the third UCI.

Optionally, the method further includes:

when the first PUCCH resource is not overlapped with the second PUCCH resource in the time domain, the first PUCCH resource is not overlapped with the third PUCCH resource in the time domain, and the second PUCCH resource is overlapped with the third PUCCH resource in the time domain, determining the fourth PUCCH resource for simultaneously transmitting the second UCI and the third UCI according to a predefined multiplexing transmission rule; and judging whether the fourth PUCCH resource and the first PUCCH resource are overlapped in the time domain.

Optionally, the determining that the first target UCI is dropped includes:

when the first UCI is Scheduling Request (SR) information, if a positive SR information transmission exists, determining that the first target UCI is dropped.

Optionally, the first target UCI is a UCI with a lower priority in the second UCI and the third UCI; or when one of the second UCI and the third UCI is channel state information (CSI), the first target UCI is one of the second UCI and the third UCI which is CSI; or when the second UCI and the third UCI are both CSI and the priorities of the second UCI and the third UCI are the same, the first target UCI is a predetermined one or any one of the second UCI and the third UCI; or the first target UCI is the third UCI.

Optionally, the UCI with the lower priority is: UCI with a lower UCI priority, UCI corresponding to a lower priority level, UCI corresponding to an enhanced mobile broadband (eMBB) service, or UCI corresponding to a lower priority service.

Optionally, the first UCI is at least one of SR information, CSI or hybrid automatic repeat request-acknowledgment (HARQ-ACK) information;

the second UCI is at least one of SR information, CSI or HARQ-ACK information;

the third UCI is at least one of SR information, CSI or HARQ-ACK information.

Optionally, a priority of the first UCI is higher than or equal to a priority of the third UCI; a priority of the second UCI is higher than or equal to the priority of the third UCI; the first UCI and the second UCI correspond to the same or different priorities;

the priority is: a corresponding UCI priority, or a corresponding priority level, or a corresponding service type, or a corresponding priority of service type.

Optionally, the determining that the first target UCI is dropped when the fourth PUCCH resource for simultaneously transmitting the second UCI and the third UCI is overlapped with the first PUCCH resource when the first PUCCH resource carrying first UCI and the second PUCCH resource carrying second UCI are not overlapped in the time domain, the first PUCCH resource is not overlapped with the third PUCCH resource carrying third UCI in the time domain, and the second PUCCH resource and the third PUCCH resource are overlapped in the time domain includes at least one of:

when the first UCI is SR or a first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, determining that the second CSI is dropped;

when the first UCI is SR or a first HARQ-ACK or CSI, the second UCI is a second HARQ-ACK, and the third UCI is a third HARQ-ACK, if PUCCH resources for simultaneously transmitting the second HARQ-ACK and the third HARQ-ACK are overlapped with PUCCH resources for carrying the SR or the first HARQ-ACK or CSI, determining that the third HARQ-ACK is dropped, where a priority of the third HARQ-ACK is lower than a priority of the second HARQ-ACK, and the priority of the third HARQ-ACK is lower than a priority of the first UCI;

when the first UCI is a first SR or a first HARQ-ACK or CSI, the second UCI is a second HARQ-ACK, and the third UCI is a second SR, if PUCCH resources for simultaneously transmitting the second HARQ-ACK and the second SR are overlapped with PUCCH resources for transmitting the first SR or the first HARQ-ACK or CSI, determining that the second SR is dropped, where a priority of the second SR is lower than or equal to a priority of the second HARQ-ACK, and the priority of the second SR is lower than or equal to a priority of the first UCI;

when the first UCI is SR or HARQ-ACK or first CSI, the second UCI is second CSI and the third UCI is third CSI, if PUCCH resources for simultaneously transmitting the second CSI and the third CSI are overlapped with PUCCH resources for transmitting the SR or HARQ-ACK or the first CSI, determining that CSI with a lower priority in the second CSI and the third CSI is dropped, where a priority of the third CSI is lower than a priority of the second CSI; or when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and priorities of the second CSI and the third CSI are the same, determining that a predetermined one or any one of the second CSI and the third CSI is dropped.

In a fifth aspect, a base station is further provided in the present disclosure, including: a transceiver, a memory, a processor, and a computer program stored in the memory and executable on the processor, where the processor is configured to execute the computer program to perform:

when a first Physical Uplink Control Channel (PUCCH) resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain, determining that a first target UCI is dropped when a fourth PUCCH resource for simultaneously transmitting the second UCI and the third UCI is overlapped with the first PUCCH resource;

the first target UCI is one of the second UCI and the third UCI.

Optionally, the processor is configured to execute the computer program to perform:

when the first PUCCH resource is not overlapped with the second PUCCH resource in the time domain, the first PUCCH resource is not overlapped with the third PUCCH resource in the time domain, and the second PUCCH resource is overlapped with the third PUCCH resource in the time domain, determining the fourth PUCCH resource for simultaneously transmitting the second UCI and the third UCI according to a predefined multiplexing transmission rule; and judging whether the fourth PUCCH resource and the first PUCCH resource are overlapped in the time domain.

Optionally, the processor is configured to execute the computer program to perform:

when the first UCI is Scheduling Request (SR) information, if a positive SR information transmission exists, determining that, the first target UCI is dropped.

Optionally, the first target UCI is a UCI with a lower priority in the second UCI and the third UCI; or when one of the second UCI and the third UCI is channel state information (CSI), the first target UCI is one of the second UCI and the third UCI which is CSI; or when the second UCI and the third UCI are both CSI and the priorities of the second UCI and the third UCI are the same, the first target UCI is a predetermined one or any one of the second UCI and the third UCI; or the first target UCI is the third UCI.

Optionally, the UCI with the lower priority is: UCI with a lower UCI priority, UCI corresponding to a lower priority level, UCI corresponding to an enhanced mobile broadband (eMBB) service, or UCI corresponding to a lower priority service.

Optionally, the first UCI is at least one of SR information, CSI or hybrid automatic repeat request-acknowledgment (HARQ-ACK) information;

the second UCI is at least one of SR information, CSI or HARQ-ACK information;

the third UCI is at least one of SR information, CSI or HARQ-ACK information.

Optionally, a priority of the first UCI is higher than or equal to a priority of the third UCI; a priority of the second UCI is higher than or equal to the priority of the third UCI; the first UCI and the second UCI correspond to the same or different priorities;

the priority is: a corresponding UCI priority, or a corresponding priority level, or a corresponding service type, or a corresponding priority of service type.

Optionally, the processor is configured to execute the computer program to perform at least one of:

when the first UCI is SR or a first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, determining that the second CSI is dropped;

when the first UCI is SR or a first HARQ-ACK or CSI, the second UCI is a second HARQ-ACK, and the third UCI is a third HARQ-ACK, if PUCCH resources for simultaneously transmitting the second HARQ-ACK and the third HARQ-ACK are overlapped with PUCCH resources for carrying the SR or the first HARQ-ACK or CSI, determining that the third HARQ-ACK is dropped, where a priority of the third HARQ-ACK is lower than a priority of the second HARQ-ACK, and the priority of the third HARQ-ACK is lower than a priority of the first UCI;

when the first UCI is a first SR or a first HARQ-ACK or CSI, the second UCI is a second HARQ-ACK, and the third UCI is a second SR, if PUCCH resources for simultaneously transmitting the second HARQ-ACK and the second SR are overlapped with PUCCH resources for transmitting the first SR or the first HARQ-ACK or CSI, determining that the second SR is dropped, where a priority of the second SR is lower than or equal to a priority of the second HARQ-ACK, and the priority of the second SR is lower than or equal to a priority of the first UCI;

when the first UCI is SR or HARQ-ACK or first CSI, the second UCI is second CSI and the third UCI is third CSI, if PUCCH resources for simultaneously transmitting the second CSI and the third CSI are overlapped with PUCCH resources for transmitting the SR or HARQ-ACK or the first CSI, determining that CSI with a lower priority in the second CSI and the third CSI is dropped, where a priority of the third CSI is lower than a priority of the second CSI; or when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and priorities of the second CSI and the third CSI are the same, determining that a predetermined one or any one of the second CSI and the third CSI is dropped.

In a sixth aspect, a base station is further provided in the present disclosure, including:

a processing module, configured to, when a first Physical Uplink Control Channel (PUCCH) resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain, determine that a first target UCI is dropped when a fourth PUCCH resource for simultaneously transmitting the second UCI and the third UCI is overlapped with the first PUCCH resource;

the first target UCI is one of the second UCI and the third UCI.

In a seventh aspect, a computer-readable storage medium storing a computer program is further provided in the present disclosure, where the computer program is executed by a processor to perform the method of processing UCI hereinabove.

The embodiment of the disclosure has the following beneficial effects:

when a first PUCCH resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain, the first target UCI is dropped when a fourth PUCCH resource for simultaneously transmitting the second UCI and the third UCI is overlapped with the first PUCCH resource, so as to transmit the first UCI on the first PUCCH resource, and transmit the second UCI on a PUCCH resource corresponding to the second target UCI (the other of the second UCI and the third UCI except the first target UCI), that is, TDM transmits the first UCI and the second target UCI, so as to avoid that UCI carried by PUCCH resources (the first PUCCH resource and the second PUCCH resource, the first PUCCH resource and the third PUCCH resource) that are not overlapped originally needs to be transmitted on one PUCCH resource due to overlapping of the second PUCCH resource and the third PUCCH resource, thereby avoiding affecting transmission delay and transmission performance of the first UCI and the second UCI.

BRIEF DESCRIPTION OF THE DRAWINGS

FIG. 1 is a first flowchart of a method of processing UCI at a terminal side according to an embodiment of the present disclosure;

FIG. 2 is a second flowchart of a method for processing UCI at a terminal side according to an embodiment of the present disclosure;

FIG. 3 is a first structural block diagram of a terminal according to an embodiment of the present disclosure;

FIG. 4 is a second structural block diagram of a terminal according to an embodiment of the present disclosure;

FIG. 5 is a first flow chart of a method of processing UCI on a base station side according to an embodiment of the present disclosure;

FIG. 6 is a second flowchart of a method for processing UCI on a base station side according to an embodiment of the present disclosure;

FIG. 7 is a first block diagrams of a base station according to an embodiment of the present disclosure;

FIG. 8 is a second block diagram of a base station according to an embodiment of the present disclosure;

DETAILED DESCRIPTION

Figure 9:
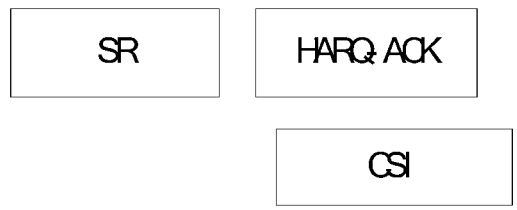
FIG. 9 is a schematic diagram of PUCCH time domain resources corresponding to first UCI, second UCI, and third UCI according to an embodiment of the present disclosure.

To make the technical problems, technical solutions and advantages to be solved by the present disclosure clearer, the following detailed description is made with reference to the accompanying drawings and specific embodiments. In the following description, specific details are provided, such as specific configurations and components, merely to facilitate a thorough understanding of embodiments of the disclosure. Accordingly, it will be apparent to those skilled in the art that various changes and modifications can be made to the embodiments described herein without departing from the scope and spirit of the disclosure. In addition, descriptions of well-known functions and constructions are omitted for clarity and conciseness.

In various embodiments of the present disclosure, it should be understood that the sequence numbers of the following processes do not mean the execution sequence, and the execution sequence of each process should be determined by the function and the inherent logic thereof, and should not constitute any limitation to the implementation process of the embodiments of the present disclosure.

In the embodiments provided herein, it should be understood that "B corresponding to A" means that B is associated with A from which B can be determined. It should also be understood that determining B from A does not mean determining B from A alone, but may also be determined from A and/or other information.

In the embodiments of the present disclosure, the terminal may be a mobile phone (or a mobile phone), or other devices capable of sending or receiving wireless signals, including user Equipment, a Personal Digital Assistant (PDA), a wireless modem, a wireless communication device, a handheld device, a laptop computer, a cordless phone, a Wireless Local Loop (WLL) station, a CPE (Customer premises Equipment) or a mobile smart hotspot capable of converting mobile signals into WiFi signals, a smart appliance, or other devices capable of autonomously communicating with a mobile communication network without human operation, and the like.

Specifically, the embodiment of the present disclosure provides a method for processing UCI, which solves the problem in the related art that when PUCCH resources for carrying UCI of different services overlap in a time domain, there is no specific transmission scheme.

First Embodiment

As shown in FIG. 1, an embodiment of the present disclosure provides a method for processing UCI, which is applied to a terminal and includes the following steps:

step 11: when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: dropping a first target UCI if a fourth PUCCH resource for simultaneously transmitting the second UCI and the third UCI is overlapped with the first PUCCH resource; where the first target UCI is one of second UCI and the third UCI.

Specifically, when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: if a fourth PUCCH resource for simultaneously transmitting the second UCI and the third UCI is overlapped with the first PUCCH resource, dropping the first target UCI, transmitting the first UCI on the first PUCCH resource, and transmitting the second target UCI on a PUCCH resource corresponding to the second target UCI; where the first target UCI is one of second UCI and the third UCI, and the second target UCI is the other one of the second UCI, and the third UCI except the first target UCI.

For example: if a fourth PUCCH resource for simultaneously transmitting the second UCI and the third UCI is overlapped with the first PUCCH resource, dropping the third UCI (i.e., the first target UCI), and transmitting the first UCI on the first PUCCH resource, and transmitting the second UCI on the second PUCCH resource, that is, transmitting the first UCI and the second UCI by time-division multiplexing (TDM).

In this embodiment, then a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: if a fourth PUCCH resource for simultaneously transmitting the second UCI and the third UCI is overlapped with the first PUCCH resource, dropping the first target UCI, so as to transmit the first UCI on the first PUCCH resource, and transmitting the second UCI on a PUCCH resource corresponding to the second target UCI (the other of the second UCI and the third UCI except the first target UCI), that is, TDM transmitting the first UCI and the second target UCI, so as to avoid that UCI carried by PUCCH resources (the first PUCCH resource and the second PUCCH resource, the first PUCCH resource and the third PUCCH resource) that are not overlapped originally needs to be transmitted on one PUCCH resource due to overlapping of the second PUCCH resource and the third PUCCH resource, thereby avoiding affecting transmission delay and transmission performance of the first UCI and the second UCI.

Second Embodiment

As shown in FIG. 2, a method for processing UCI is further provided in an embodiment of the present disclosure, which is applied to a terminal and includes the following steps:

step 21: when the first PUCCH resource is not overlapped with the second PUCCH resource in the time domain, the first PUCCH resource is not overlapped with the third PUCCH resource in the time domain, and the second PUCCH resource and the third PUCCH resource are overlapped in the time domain: determining a fourth PUCCH resource for simultaneously transmitting the second UCI and the third UCI according to a predefined multiplexing transmission rule.

Optionally, the determining, according to a predefined multiplexing transmission rule, a fourth PUCCH resource for simultaneously transmitting the second UCI and the third UCI may further include: determining the fourth PUCCH resource for simultaneously transmitting the second UCI and the third UCI according to the type of the second UCI and/or the PUCCH format used for transmitting the second UCI, and the type of the third UCI and/or the PUCCH format used for transmitting the third UCI.

The fourth PUCCH resource is: the second PUCCH resource, or the third PUCCH resource, or a PUCCH resource that is different from the second PUCCH resource and the third PUCCH resource.

In the NR system, 5 PUCCH formats, NR PUCCH formats (formats) 0, 1, 2, 3, and 4, are defined, where PUCCH format 0 and 1 may carry 1-2 bit UCI transmission, and PUCCH format 2, 3, and 4 may carry more than 2 bit UCI transmission.

HARQ-ACK information may be transmitted using any of these 5 PUCCH formats: the base station can configure at least one PUCCH resource set for the terminal, one PUCCH resource set can contain a plurality of PUCCH resources, and different PUCCH resources can correspond to the same or different PUCCH formats.

If only one PUCCH resource set is configured, the set only includes PUCCH format 0, 1 resources, and therefore, the method can be only used for transmitting 1-2 bit HARQ-ACK information.

If more than one PUCCH resource set is configured, different PUCCH resource sets can correspond to different UCI bit number ranges, the terminal can select one PUCCH resource set according to the bit number of the HARQ-ACK information (if other UCIs are multiplexed with the HARQ-ACK, the total bit number of all the UCIs), and then a PUCCH resource is determined in the determined PUCCH resource set according to a PUCCH resource indication field in a Physical Downlink Control Channel (PDCCH) corresponding to the HARQ-ACK information and is used for transmitting the HARQ-ACK information (or being multiplexed with other UCIs). Where, when the HARQ-ACK information is feedback information of a Physical Downlink control Channel (PDSCH), the PUCCH is a PDCCH for scheduling the PDSCH; or, when the HARQ-ACK information is feedback information indicating a PDCCH for releasing downlink Semi-Persistent Scheduling (SPS) resources, the PDCCH is the PDCCH itself for releasing the SPS resources.

For HARQ-ACK information without corresponding PDCCH, i.e. carrying SPS HARQ-ACK information (i.e. HARQ-ACK information corresponding to SPS PDSCH), since one SPS HARQ-ACK information is only 1 bit, PUCCH format 0 or 1 may be used for transmission on 1 PUCCH resource configured by higher layer signaling. Scheduling Request (SR) information may be transmitted on one PUCCH resource configured by higher layer signaling using PUCCH format 0 or 1. Periodic Channel State Information (CSI) may be configured to be transmitted on one PUCCH resource configured by higher layer signaling using PUCCH format 2 or 3 or 4.

The following specifically describes, in combination with a specific scenario, that a fourth PUCCH resource for simultaneously transmitting the second UCI and the third UCI is determined according to a predefined multiplexing transmission rule:

in the NR system, PUCCH resources carrying UCI are transmitted on a slot basis, that is, any uplink symbol in a slot may be allocated to the PUCCH resources for transmission. When the PUCCH resources carrying different UCIs overlap in the time domain, a fourth PUCCH resource for simultaneously transmitting second UCI and third UCI is determined according to the following method (for multiplexing transmission of the HARQ-ACK information and the CSI, the condition that the HARQ-ACK information and the CSI are allowed to be simultaneously transmitted is configured, otherwise, the CSI is dropped):

Scenario one: when the PUCCH resource carrying the SR information and the PUCCH resource carrying the HARQ-ACK information are overlapped in a time domain, and the PUCCH resource carrying the HARQ-ACK information uses PUCCH format 0 (the PUCCH resource carrying the SR can use PUCCH format 0 or PUCCH format 1), the PUCCH resource carrying the HARQ-ACK information is determined as a fourth PUCCH resource for simultaneously transmitting the HARQ-ACK information and the SR information.

Scenario two: when the PUCCH resource carrying SR information is overlapped with the PUCCH resource carrying HARQ-ACK information in the time domain, and the PUCCH resource carrying SR information uses PUCCH format 0 and the PUCCH resource carrying HARQ-ACK information uses PUCCH format 1, the SR information is dropped, that is, no multiplexing transmission is performed at this time.

Scenario three: when a PUCCH resource carrying SR information and a PUCCH resource carrying HARQ-ACK information are overlapped in the time domain, the PUCCH resource carrying SR information uses PUCCH format 1, and the PUCCH resource carrying HARQ-ACK information uses PUCCH format 1, when positive (positive) SR exists, the PUCCH resource carrying SR information is determined as the PUCCH resource for simultaneously transmitting HARQ-ACK information and SR information.

Scenario four: when a PUCCH resource bearing SR Information and a PUCCH resource bearing HARQ-ACK Information are overlapped in a time domain, and the PUCCH resource bearing HARQ-ACK Information uses PUCCH format 2, 3 or 4 (the PUCCH resource bearing SR Information can use PUCCH format 0 or PUCCH format 1), a PUCCH resource set is determined according to the SR Information and the total bit number of the HARQ-ACK Information, and a PUCCH resource is determined in the determined PUCCH resource set according to a PUCCH resource indication field in Downlink Control Information (DCI) corresponding to the HARQ-ACK Information and used for simultaneously transmitting the SR Information and the HARQ-ACK Information.

Here, the SR information is X bits and indicates an SR state (which is positive or all negative) among X pieces of SR information overlapped with the HARQ-ACK information, that is, the X-bit SR information is always transmitted regardless of whether the SR state is positive or negative (negative), so as to avoid a change in the number of UCI bits transmitted on the PUCCH resource of the HARQ-ACK information due to the SR state.

Scene five: when the PUCCH resources carrying the SPS HARQ-ACK information (namely, the HARQ-ACK corresponding to the SPS PDSCH, namely, the HARQ-ACK without the corresponding PUCCH) and/or the SR information are overlapped with the PUCCH resources carrying the CSI in a time domain, the PUCCH resources corresponding to the CSI are determined to be the PUCCH resources used for simultaneously transmitting the SPS HARQ-ACK information and/or the SR information and the CSI.

Scene six: when the PUCCH resources of the HARQ-ACK information of the PDSCH and the PUCCH resources carrying CSI are overlapped in the time domain, one PUCCH resource set is selected from a plurality of PUCCH resource sets according to the total bit number of the HARQ-ACK information and the CSI information, and one PUCCH resource is determined from the selected PUCCH resource set according to a PUCCH resource indication domain in the DCI corresponding to the HARQ-ACK information and is used for simultaneously carrying the HARQ-ACK information and the CSI.

At this time, the re-determined PUCCH resource may be the same as or different from the PUCCH resource originally carrying the HARQ-ACK information (i.e. a new PUCCH resource if different). The terminal is not expected to be configured to support HARQ-ACK and CSI simultaneous transmission when it is configured with only one PUCCH resource set.

When there are multiple PUCCH resources in one slot and there is overlap between the PUCCH resources in the time domain: if PUCCH resources in one time slot form a set Q, determining an uplink channel with the earliest starting time in the set Q as a channel A, and determining a channel set X which is overlapped with the channel A in the time domain; and obtaining a channel resource for multiplexing transmission for the UCI on the channel A and the channel X according to the multiplexing transmission rule, replacing the channel A and the channel X in the set Q with the channel resource for multiplexing transmission, continuing the steps to determine the channel A and the channel X in the new set Q, and so on until obtaining a plurality of PUCCHs which are not overlapped in time domain.

Optionally, the determining, according to a predefined multiplexing transmission rule, a fourth PUCCH resource for simultaneously transmitting the second UCI and the third UCI may include: when second UCI and third UCI contain HARQ-ACK, judging whether the overlapping part of the second PUCCH resource and the third PUCCH resource meets a time condition or not; and if the time condition is met, determining a fourth PUCCH resource for simultaneously transmitting the second UCI and the third UCI according to a predefined multiplexing transmission rule.

Specifically, if there is a PUCCH carrying HARQ-ACK, it needs to determine whether a time condition (Timeline) is satisfied between overlapping PUCCHs, and when the time condition is satisfied, multiplexing transmission is allowed to be performed, where the time condition is to make a decision on how to multiplex before the earliest transmission start time by the terminal, and to complete transmission preparation on the earliest channel according to the multiplexing decision. And the terminal does not expect the occurrence of the scheduling case not satisfying the time condition, it is considered as an erroneous scheduling if the occurrence of the scheduling case not satisfying the time condition.

Timeline 1: the time interval between the starting symbol of the earliest channel in the overlapped channels and the ending symbol of any one PDSCH in the PDSCH corresponding to the HARQ-ACK information is not shorter than T1 time; that is, the start symbol of the earliest one of the overlapped channels is not earlier than T1 time after the end symbol of any one of the PDSCHs corresponding to the HARQ-ACK information;

Timeline 2: if the HARQ-ACK has the corresponding PDCCH, the time interval between the starting symbol of the earliest channel in the overlapped channels and the ending symbol of any one of the PDCCHs corresponding to the HARQ-ACK is not shorter than T2 time; i.e., the start symbol of the earliest one of the overlapping channels is not earlier than T2 times after the end symbol of any one of the PDCCHs corresponding to the HARQ-ACK.

Step 22: judging whether the fourth PUCCH resource and the first PUCCH resource are overlapped in the time domain.

Step 23: dropping a first target UCI if a fourth PUCCH resource for simultaneously transmitting the second UCI and the third UCI is overlapped with the first PUCCH resource; where the first target UCI is one of second UCI and the third UCI.

Specifically, if a fourth PUCCH resource for simultaneously transmitting the second UCI and the third UCI is overlapped with the first PUCCH resource, dropping be first target UCI, transmitting the first UCI on the first PUCCH resource, and transmitting the second target UCI on a PUCCH resource corresponding to the second target UCI, where the first target UCI is one of second UCI and the third UCI, and the second target UCI is the other one of the second UCI and the third UCI except the first target UCI.

For example: if a fourth PUCCH resource for simultaneously transmitting the second UCI and the third UCI is overlapped with the first PUCCH resource, dropping the third UCI (i.e., the first target UCI), and transmitting the first UCI on the first PUCCH resource, and transmitting the second UCI on the second PUCCH resource, that is, transmitting the first and the second UCI by time-division multiplexing (TDM).

In this embodiment, when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: if a fourth PUCCH resource for simultaneously transmitting the second UCI and the third UCI is overlapped with the first PUCCH resource, dropping the first target UCI, so as to transmit the first UCI on the first PUCCH resource, and transmitting the second UCI on a PUCCH resource corresponding to the second target UCI (the other of the second UCI and the third UCI except the first target UCI), that is, TDM transmitting the first UCI and the second target UCI, so as to avoid that UCI carried by PUCCH resources (the first PUCCH resource and the second PUCCH resource, the first PUCCH resource and the third PUCCH resource) that are not overlapped originally needs to be transmitted on one PUCCH resource due to overlapping of the second PUCCH resource and the third PUCCH resource, thereby avoiding affecting transmission delay and transmission performance of the first UCI and the second UCI.

Optionally, according to at least one of the above embodiments, the step of dropping the first target UCI may include:

if the first UCI is Scheduling Request (SR) information, if there is positive (positive) SR information transmission, dropping the first target UCI.

Further, according to at least one of the above embodiments, the first target UCI is: a low priority UCI in the second UCI and the third UCI.

The low priority UCI is: UCI with low UCI priority (for example, UCI priority may be HARQ-ACK>SR>CSI from high to low), or UCI with low priority level (for example, priority level may be defined as level 1, level 2, level 3, etc.), or UCI corresponding to enhanced mobile broadband (eMBB) service, or UCI corresponding to a lower priority service (that is, different services have different priorities, UCI may determine a corresponding service type according to a predetermined manner, so that priority of a corresponding service type may be determined, for example, UCI may be determined as eMBB service or URLLC service, priority of eMBB service is lower than priority of URLLC service).

Further, according to at least one of the above embodiments, in case that one of the second UCI and the third UCI is channel state information, CSI, the first target UCI is: one of the second UCI and the third UCI is CSI.

Further, according to at least one of the above embodiments, in a case that the second UCI and the third UCI are both CSI and the priority of the second UCI and the priority of the third UCI are the same, the first target UCI is: a predetermined one or any one of the second UCI and the third UCI.

The predetermined one may be: the earliest transmission time or the latest transmission time; in particular, any one of the second UCI and the third UCI may be dropped when the transmission timings are aligned, such as: the third UCI is dropped directly.

Further, according to at least one of the above embodiments, the first target UCI is: the third UCI.

Optionally, the first UCI is at least one of SR information, CSI, and HARQ-ACK information; the second UCI is at least one of SR information, CSI and HARQ-ACK information; the third UCI is at least one of SR information, CSI and HARQ-ACK information. Where the second UCI and the third UCI may be the same or different in type.

Optionally, the priority of the first UCI is higher than or equal to the priority of the third UCI; the priority of the second UCI is higher than or equal to the priority of the third UCI; the first UCI and the second UCI correspond to the same or different priorities;

the priority is: corresponding UCI priority, or corresponding priority level, or corresponding service type, or corresponding priority of service type.

In at least one embodiment, with reference to the specific scenario below, when a first physical uplink control channel PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: specifically, if a fourth PUCCH resource for simultaneously transmitting the second UCI and the third UCI is overlapped with the first PUCCH resource, the method of dropping the first target UCI is described as follows:

Scenario one: when the first UCI is SR or first HARQ-ACK or first CSI, the second UCI is second HARQ-ACK, and the third UCI is second CSI:

dropping the second CSI if PUCCH resources used for simultaneously transmitting the second HARQ-ACK and the second CSI overlap PUCCH resources used for carrying the SR or the first HARQ-ACK or the first CSI; where the first UCI and the second HARQ-ACK information may correspond to the same or different priorities.

For example: when the first UCI is SR, the SR corresponds to priority level 1 or URLLC service or high priority service type, and the HARQ-ACK information corresponds to priority level 2 or eMBB service or low priority service type; or the SR information and the HARQ-ACK information both correspond to a priority level 1 or a URLLC service or a high priority service type; or the SR information and the HARQ-ACK information both correspond to a priority level 2 or an eMBB service or a low priority service type; or the HARQ-ACK information corresponds to a priority level 1 or URLLC service or a high priority service type, and the SR information corresponds to a priority level 2 or eMBB service or a low priority service type. Where priority level 1 is higher than priority level 2.

Scenario two: when the first UCI is SR or first HARQ-ACK or CSI, the second UCI is second HARQ-ACK, and the third UCI is third HARQ-ACK:

dropping the third HARQ-ACK if PUCCH resources used for simultaneously transmitting the second HARQ-ACK and the third HARQ-ACK overlap with PUCCH resources used for carrying the SR or the first HARQ-ACK or the CSI.

The priority of the third HARQ-ACK is lower than that of the second HARQ-ACK, and the priority of the third HARQ-ACK is lower than that of the first UCI.

The priority of the first UCI is the same as or different from the priority of the second HARQ-ACK information.

For example: when the first UCI is SR information, the SR corresponds to priority level 1 or URLLC service or high priority service, the first HARQ-ACK information corresponds to priority level 1 or URLLC service or high priority service, the second HARQ-ACK information corresponds to priority level 2 or eMBB service or low priority service type, and the priority level 1 is higher than the priority level 2.

Scenario three: when the first UCI is a first SR or a first HARQ-ACK or CSI, the second UCI is a second HARQ-ACK, and the third UCI is a second SR:

dropping the second SR if PUCCH resources for simultaneously transmitting the second HARQ-ACK and the second SR overlap with PUCCH resources for transmitting the first SR or the first HARQ-ACK or CSI.

The priority of the second SR is lower than or equal to the priority of the second HARQ-ACK, and the priority of the second SR is lower than or equal to the priority of the first UCI. Where the priority of the first UCI is the same as or different from the priority of the second HARQ-ACK information.

For example: when the first UCI is first SR information, the first SR information and the second HARQ-ACK information correspond to priority level 1 or URLLC service or high priority service, and the second SR information corresponds to priority level 2 or eMBB service or low priority service; or the first SR information, the second HARQ-ACK information, and the second SR information all correspond to the same priority or service type priority, such as: all corresponding to priority level 1 or URLLC traffic or high priority traffic, or all corresponding to priority level 2 or eMBB traffic or low priority traffic. Where priority level 1 is higher than priority level 2.

Scenario four: when the first UCI is SR or HARQ-ACK or first CSI, the second UCI is second CSI, and the third UCI is third CSI:

dropping low priority CSI in the second CSI and the third CSI if PUCCH resources used for simultaneously transmitting the second CSI and the third CSI overlap PUCCH resources used for transmitting the SR or HARQ-ACK or the first CSI.

The third CSI has a lower priority than the second CSI. For example, when the first UCI is SR information, the SR corresponds to a priority level 1 or URLLC service or a high priority service type, or the SR corresponds to a priority level 2 or eMBB service or a low priority service type. Where priority level 1 is higher than priority level 2.

Scenario five: when the first UCI is SR or HARQ-ACK or first CSI, the second UCI is second CSI, and the third UCI is third CSI:

if the PUCCH resources used for simultaneously transmitting the second CSI and the third CSI are overlapped with the PUCCH resources used for carrying the SR, the HARQ-ACK or the first CSI and the priorities of the second CSI and the third CSI are the same, dropping a preset or any one of the second CSI and the third CSI.

For example: dropping the one of the second CSI and the third CSI with the earliest transmission time or the one with the latest transmission time; in particular, any one of the second UCI and the third UCI may be dropped when the transmission timings are aligned, such as: the third UCI is dropped directly.

Third Embodiment

The first embodiment and the second embodiment are respectively described in terms of a UCI method of processing the present disclosure, and the following embodiments will further describe a terminal corresponding to the first embodiment and the second embodiment with reference to the drawings.

Specifically, as shown in FIG. 3, the present disclosure provides a terminal 300, including:

a processing module 310, configured to, when a first physical uplink control channel PUCCH resource carrying first UCI is not overlapped with a second PUCCH resource carrying second in a time domain, the first PUCCH resource is not overlapped with a third PUCCH resource carrying third UCI in the time domain, and the second PUCCH resource and the third PUCCH resource overlap in the time domain: dropping a first target UCI if a fourth PUCCH resource for simultaneously transmitting the second UCI and the third UCI is overlapped with the first PUCCH resource; where the first target UCI is one of second UCI and the third UCI.

Optionally, the terminal 300 further includes:

a determining module, configured to, when the first PUCCH resource is not overlapped with the second PUCCH resource in time domain, the first PUCCH resource is not overlapped with the third PUCCH resource in time domain, and the second PUCCH resource and the third PUCCH resource overlap in time domain, determine a fourth PUCCH resource for simultaneously transmitting the second UCI and the third UCI according to a predefined multiplexing transmission rule; and a judging module, configured to judge whether the fourth PUCCH resource and the first PUCCH resource are overlapped in the time domain.

Optionally, the processing module 310 includes:

a processing unit, configured to drop the first target UCI if there is positive SR information transmission when the first UCI is scheduling request, SR, information.

Optionally, the first target UCI is: a low priority UCI in the second and third UCI;

or, when one of the second UCI and the third UCI is channel state information (CSI), the first target UCI is: one of the second UCI and the third UCI which is CSI;

or, when the second UCI and the third UCI are both CSI and the priorities of the second UCI and the third UCI are the same, the first target UCI is: a predetermined one or any one of the second UCI and the third UCI;

or, the first target UCI is: the third UCI.

Optionally, the UCI of low priority is: the UCI with low priority is corresponding to the UCI with low priority level, or the UCI with low priority level is corresponding to the UCI of enhanced mobile broadband (eMBB) service, or the UCI corresponding to a lower priority service.

Optionally, the first UCI is at least one of SR information, CSI, and hybrid automatic repeat request acknowledgment HARQ-ACK information;

the second UCI is at least one of SR information, CSI and HARQ-ACK information;

the third UCI is at least one of SR information, CSI and HARQ-ACK information.

Optionally, the priority of the first UCI is higher than or equal to the priority of the third UCI; the priority of the second UCI is higher than or equal to the priority of the third UCI; the first UCI and the second UCI correspond to the same or different priorities;

the priority is: corresponding UCI priority, or corresponding priority level, or corresponding service type, or corresponding priority of service type.

Optionally, the processing module 310 is specifically configured to at least one of:

when the first UCI is SR or first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, the second CSI is dropped;

when the first UCI is SR or first HARQ-ACK or CSI, the second UCI is second HARQ-ACK, and the third UCI is third HARQ-ACK, if PUCCH resources used for simultaneously transmitting the second HARQ-ACK and the third HARQ-ACK are overlapped with PUCCH resources used for carrying the SR or the first HARQ-ACK or CSI, dropping the third HARQ-ACK, where the priority of the third HARQ-ACK is lower than that of the second HARQ-ACK, and the priority of the third HARQ-ACK is lower than that of the first UCI;

when the first UCI is a first SR or a first HARQ-ACK or CSI, the second UCI is a second HARQ-ACK, and the third UCI is a second SR, if PUCCH resources used for simultaneously transmitting the second HARQ-ACK and the second SR are overlapped with PUCCH resources used for transmitting the first SR or the first HARQ-ACK or CSI, dropping the second SR, where the priority of the second SR is lower than or equal to that of the second HARQ-ACK, and the priority of the second SR is lower than or equal to that of the first UCI;

when the first UCI is SR or HARQ-ACK or first CSI, the second UCI is second CSI and the third UCI is third CSI, if PUCCH resources used for simultaneously transmitting the second CSI and the third CSI are overlapped with PUCCH resources used for transmitting the SR or HARQ-ACK or the first CSI, dropping low-priority CSI in the second CSI and the third CSI, where the priority of the third CSI is lower than the low priority of the second CSI;

when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and the priorities of the second CSI and the third CSI are the same, a predetermined one or any one of the second CSI and the third CSI is dropped.

The terminal embodiment of the present disclosure corresponds to the embodiment of the method, and all implementation means in the method embodiment are applicable to the embodiment of the base station, and the same technical effect can be achieved.

In the terminal 300 in this embodiment, when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: if a fourth PUCCH resource for simultaneously transmitting the second UCI and the third UCI is overlapped with the first PUCCH resource, dropping the first target UCI, so as to transmit the first UCI on the first PUCCH resource, and transmitting the second UCI on a PUCCH resource corresponding to the second target UCI (the other of the second UCI and the third UCI except the first target UCI), that is, TDM transmitting the first UCI and the second target UCI, so as to avoid that UCI carried by PUCCH resources (the first PUCCH resource and the second PUCCH resource, the first PUCCH resource and the third PUCCH resource) that are not overlapped originally needs to be transmitted on one PUCCH resource due to overlapping of the second PUCCH resource and the third PUCCH resource, thereby avoiding affecting transmission delay and transmission performance of the first UCI and the second UCI.

Fourth Embodiment

As shown in FIG. 4, the present embodiment provides a terminal, including:

a processor 41; and a memory 43 connected to the processor 41 through a bus interface 42, where the memory 43 is used for storing programs and data used by the processor 41 in executing operations, and when the processor 41 calls and executes the programs and data stored in the memory 43, the following procedure is executed.

A transceiver 44 is connected to the bus interface 42 for receiving and transmitting data under control of the processor 41.

In particular, the processor 41, when executing the computer program, implements the following steps:

when a first Physical Uplink Control Channel (PUCCH) resource carrying first UCI and a second PUCCH resource carrying second UCI are not overlapped in a time domain, the first PUCCH resource is not overlapped in the time domain with a third PUCCH resource carrying third UCI, and the second PUCCH resource and the third PUCCH resource are overlapped in the time domain:

dropping a first target UCI if a fourth PUCCH resource for simultaneously transmitting the second UCI and the third UCI is overlapped with the first PUCCH resource;

the first target UCI is one of second UCI and the third UCI.

The processor 41, when executing the computer program, further implements the steps of:

when the first PUCCH resource is not overlapped with the second PUCCH resource in the time domain, the first PUCCH resource is not overlapped with the third PUCCH resource in the time domain, and the second PUCCH resource and the third PUCCH resource are overlapped in the time domain:

determining a fourth PUCCH resource for simultaneously transmitting the second UCI and the third UCI according to a predefined multiplexing transmission rule; and judging whether the fourth PUCCH resource and the first PUCCH resource are overlapped in the time domain.

The processor 41, when executing the computer program, further implements the steps of:

when the first UCI is Scheduling Request (SR) information, if positive SR information transmission exists, dropping the first target UCI.

The first target UCI is: a low priority UCI in the second and third UCI;

or, in a case that one of the second UCI and the third UCI is channel state information (CSI), the first target UCI is: one of the second UCI and the third UCI which is CSI;

or, when the second UCI and the third UCI are both CSI and the priorities of the second UCI and the third UCI are the same, the first target UCI is: a predetermined one or any one of the second UCI and the third UCI;

or, the first target UCI is: the third UCI.

The low priority UCI is: the UCI with low priority is corresponding to the UCI with low priority level, or the UCI with low priority level is corresponding to the UCI of enhanced mobile broadband (eMBB) service, or the UCI corresponding to a lower priority service.

The first UCI is at least one of SR information, CSI and hybrid automatic repeat request-acknowledgment (HARQ-ACK) information;

the second UCI is at least one of SR information, CSI and HARQ-ACK information;

the third UCI is at least one of SR information, CSI and HARQ-ACK information.

A priority of the first UCI is higher than or equal to a priority of the third UCI; the priority of the second UCI is higher than or equal to the priority of the third UCI; the first UCI and the second UCI correspond to the same or different priorities;

the priority is: corresponding UCI priority, or corresponding priority level, or corresponding service type, or corresponding priority of service type.

The processor 41, when executing the computer program, performs at least one of the following steps:

when the first UCI is SR or first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, the second CSI is dropped;

when the first UCI is SR or first HARQ-ACK or CSI, the second UCI is second HARQ-ACK, and the third UCI is third HARQ-ACK, if PUCCH resources used for simultaneously transmitting the second HARQ-ACK and the third HARQ-ACK are overlapped with PUCCH resources used for carrying the SR or the first HARQ-ACK or CSI, dropping the third HARQ-ACK, where the priority of the third HARQ-ACK is lower than that of the second HARQ-ACK, and the priority of the third HARQ-ACK is lower than that of the first UCI;

when the first UCI is a first SR or a first HARQ-ACK or CSI, the second UCI is a second HARQ-ACK, and the third UCI is a second SR, if PUCCH resources used for simultaneously transmitting the second HARQ-ACK and the second SR are overlapped with PUCCH resources used for transmitting the first SR or the first HARQ-ACK or CSI, dropping the second SR, where the priority of the second SR is lower than or equal to that of the second HARQ-ACK, and the priority of the second SR is lower than or equal to that of the first UCI;

when the first UCI is SR or HARQ-ACK or first CSI, the second UCI is second CSI and the third UCI is third CSI, if PUCCH resources used for simultaneously transmitting the second CSI and the third CSI are overlapped with PUCCH resources used for transmitting the SR or HARQ-ACK or the first CSI, dropping low-priority CSI in the second CSI and the third CSI, where the priority of the third CSI is lower than the low priority of the second CSI;

when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and the priorities of the second CSI and the third CSI are the same, a predetermined one or any one of the second CSI and the third CSI is dropped. It should be noted that in FIG. 4, the bus architecture may include any number of interconnected buses and bridges, with one or more processors represented by processor 41 and various circuits represented by memory 43 being linked together. The bus architecture may also link together various other circuits such as peripherals, voltage regulators, power management circuits, and the like, which are well known in the art, and therefore, will not be described any further herein. The bus interface provides an interface. The transceiver 44 may be a plurality of elements, including a transmitter and a transceiver, providing a means for communicating with various other apparatus over a transmission medium. For different terminals, the user interface 45 may also be an interface capable of interfacing with a desired device, including but not limited to a keypad, display, speaker, microphone, joystick, etc. The processor 41 is responsible for managing the bus architecture and general processing, and the memory 43 may store data used by the processor 41 in performing operations.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium.

The embodiments of the present disclosure further provide a computer-readable storage medium, where a computer program is stored in the computer-readable storage medium, and when the computer program is executed by a processor, the computer program implements each process of the embodiment of the method for processing UCI on the terminal side, and can achieve the same technical effect, and in order to avoid repetition, the computer program is not described herein again. The computer-readable storage medium may be a Read-Only Memory (ROM), a Random Access Memory (RAM), a magnetic disk or an optical disk.

Fifth Embodiment

The method for processing UCI according to the embodiment of the present disclosure is introduced from the terminal side, and the method for processing UCI at the base station side will be further described with reference to the drawings.

As shown in FIG. 5, a method for processing UCI is further provided in an embodiment of the present disclosure, which is applied to a base station and includes:

step 51: when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: determining that a first target UCI is dropped if a fourth PUCCH resource for simultaneously transmitting the second UCI and the third UCI is overlapped with the first PUCCH resource; where the first target UCI is one of second UCI and the third UCI.

Specifically, when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: if a fourth PUCCH resource for simultaneously transmitting the second UCI and the third UCI is overlapped with the first PUCCH resource, determining that a first target UCI is dropped, receiving the first UCI on the first PUCCH resource, and receiving a second target UCI on a PUCCH resource corresponding to a second target UCI; where the first target UCI is one of second UCI and the third UCI, and the second target UCI is the other one of the second UCI and the third UCI except the first target UCI.

For example: determining that third UCI (i.e., a first target UCI) is dropped and receiving the first UCI on a first PUCCH resource and receiving second UCI on a second PUCCH resource if a fourth PUCCH resource for simultaneously transmitting the second UCI and the third UCI overlaps the first PUCCH resource.

In this embodiment, when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: if a fourth PUCCH resource for simultaneously transmitting the second UCI and the third UCI is overlapped with the first PUCCH resource, determining that the first target UCI is dropped, so as to receive the first UCI on the first PUCCH resource, and receiving the second UCI on a PUCCH resource corresponding to the second target UCI (the other one of the second UCI and the third UCI except the first target UCI), so as to avoid that UCI carried by PUCCH resources (the first PUCCH resource and the second PUCCH resource, the first PUCCH resource and the third PUCCH resource) which are originally not overlapped needs to be transmitted on one PUCCH resource due to overlapping of the second PUCCH resource and the third PUCCH resource, thereby avoiding affecting transmission delay and transmission performance of the first UCI and the second UCI.

Sixth Embodiment

As shown in FIG. 6, an embodiment of the present disclosure further provides a method for processing UCI, which is applied to a base station and includes the following steps:

step 61: when the first PUCCH resource is not overlapped with the second PUCCH resource in the time domain, the first PUCCH resource is not overlapped with the third PUCCH resource in the time domain, and the second PUCCH resource and the third PUCCH resource are overlapped in the time domain: determining a fourth PUCCH resource for simultaneously transmitting the second UCI and the third UCI according to a predefined multiplexing transmission rule.

For the predefined multiplexing transmission rule, reference may be made to the method for determining the fourth PUCCH resource for simultaneously transmitting the second UCI and the third UCI in the embodiment on the base station side, which is not described herein again.

step 62: judging whether the fourth PUCCH resource and the first PUCCH resource are overlapped in the time domain.

step 63: determining that a first target UCI is dropped if a fourth PUCCH resource for simultaneously transmitting the second UCI and the third UCI is overlapped with the first PUCCH resource; where the first target UCI is one of second UCI and the third UCI.

Specifically, when a first PUCCH resource carrying first UCI and a second PUCCH resource carrying second UCI do not overlap in a time domain, the first PUCCH resource and a third PUCCH resource carrying third UCI do not overlap the time domain, and the second PUCCH resource and the third PUCCH resource overlap in the time domain: if a fourth PUCCH resource for simultaneously transmitting the second UCI and the third UCI is overlapped with the first PUCCH resource, determining that a first target UCI is dropped, receiving the first UCI on the first PUCCH resource, and receiving a second target UCI on a PUCCH resource corresponding to a second target UCI; where the first target UCI is one of second UCI and the third UCI, and the second target UCI is the other one of the second UCI and the third UCI except the first target UCI.

For example: determining that third UCI (i.e., a first target UCI) is dropped and receiving the first UCI on a first PUCCH resource and receiving second UCI on a second PUCCH resource if a fourth PUCCH resource for simultaneously transmitting the second UCI and the third UCI overlaps the first PUCCH resource.

In this embodiment, when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: if a fourth PUCCH resource for simultaneously transmitting the second UCI and the third UCI is overlapped with the first PUCCH resource, determining that the first target UCI is dropped, so as to receive the first UCI on the first PUCCH resource, and receiving the second UCI on a PUCCH resource corresponding to the second target UCI (the other one of the second UCI and the third UCI except the first target UCI), so as to avoid that UCI carried by PUCCH resources (the first PUCCH resource and the second PUCCH resource, the first PUCCH resource and the third PUCCH resource) which are originally not overlapped needs to be transmitted on one PUCCH resource due to overlapping of the second PUCCH resource and the third PUCCH resource, thereby avoiding affecting transmission delay and transmission performance of the first UCI and the second UCI.

Optionally, according to at least one of the above embodiments, the step of determining that the first target UCI is dropped may include:

when the first UCI is Scheduling Request (SR) information, if positive SR information transmission exists, determining that the first target UCI is dropped.

Further, according to at least one of the above embodiments, the first target UCI is: a lower priority UCI in the second UCI and the third UCI.

the low priority UCI is: the UCI with low priority is corresponding to the UCI with low priority level, or the UCI with low priority level is corresponding to the UCI of enhanced mobile broadband (eMBB) service, or the UCI corresponding to a lower priority service.

Further, according to at least one of the above embodiments, in a case that one of the second UCI and the third UCI is channel state information (CSI), the first target UCI includes: one of the second UCI and the third UCI is CSI.

Further, according to at least one of the above embodiments, in a case that the second UCI and the third UCI are both CSI and have the same priority as the third UCI, the first target UCI includes: a predetermined one or any one of the second UCI and the third UCI.

The predetermined one may be: the earliest transmission time or the latest transmission time; in particular, any one of the second UCI and the third UCI may be dropped when the transmission timings are aligned, such as: the third UCI is dropped directly.

Further, according to at least one of the above embodiments, in the first target UCI: the third UCI.

Optionally, the first UCI is at least one of SR information, CSI, and HARQ-ACK information; the second UCI is at least one of SR information, CSI and HARQ-ACK information; the third UCI is at least one of SR information, CSI and HARQ-ACK information. The second UCI and the third UCI may be the same or different in type.

Optionally, the priority of the first UCI is higher than or equal to the priority of the third UCI; the priority of the second UCI is higher than or equal to the priority of the third UCI; the priority of the first UCI is the same as or different from the priority of the second UCI;

the priority is: corresponding UCI priority, or corresponding priority level, or corresponding service type, or corresponding priority of service type.

In at least one embodiment, with reference to the specific scenario below, when a first physical uplink control channel PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: specifically, if a fourth PUCCH resource for simultaneously transmitting the second UCI and the third UCI is overlapped with the first PUCCH resource, the method of determining that the first target UCI is dropped is described as follows:

Scenario one: when the first UCI is SR or first HARO-ACK or first CSI, the second UCI is second HARQ-ACK, and the third UCI is second CSI:

determining that the second CSI is dropped if PUCCH resources used for simultaneously transmitting the second HARQ-ACK and the second CSI overlap PUCCH resources used for carrying the SR or the first HARQ-ACK or the first CSI.

The first UCI and the second HARQ-ACK information may correspond to the same or different priorities.

For example: when the first UCI is SR, the SR corresponds to priority level 1 or URLLC service or high priority service type, and the HARQ-ACK information corresponds to priority level 2 or eMBB service or low priority service type; or the SR information and the HARQ-ACK information both correspond to a priority level 1 or a URLLC service or a high priority service type; or the SR information and the HARQ-ACK information both correspond to a priority level 2 or an eMBB service or a low priority service type; or the HARQ-ACK information corresponds to a priority level 1 or URLLC service or a high priority service type, and the SR information corresponds to a priority level 2 or eMBB service or a low priority service type. Where priority level 1 is higher than priority level 2.

Scenario two: when the first UCI is SR or first HARQ-ACK or CSI, the second UCI is second HARQ-ACK, and the third UCI is third HARQ-ACK:

determining that the third HARQ-ACK is dropped if PUCCH resources used for simultaneously transmitting the second HARQ-ACK and the third HARQ-ACK overlap with PUCCH resources used for carrying the SR or the first HARQ-ACK or the CST.

The priority of the third HARQ-ACK is lower than that of the second HARQ-ACK, and the priority of the third HARQ-ACK is lower than that of the first UCI;

The priority of the first UCI is the same as or different from the priority of the second HARQ-ACK information.

For example: when the first UCI is SR information, the SR corresponds to priority level 1 or URLLC service or high priority service, the first HARQ-ACK information corresponds to priority level 1 or URLLC service or high priority service, the second HARQ-ACK information corresponds to priority level 2 or eMBB service or low priority service type, and the priority level 1 is higher than the priority level 2.

Scenario three: when the first UCI is a first SR or a first HARQ-ACK or CSI, the second UCI is a second HARQ-ACK, and the third UCI is a second SR:

determining that the second SR is dropped if PUCCH resources for simultaneous transmission of the second HARQ-ACK and the second SR overlap with PUCCH resources for transmission of the first SR or first HARQ-ACK or CSI.

A priority of the second SR is lower than or equal to a priority of the second HARQ-ACK, and a priority of the second SR is lower than or equal to a priority of the first UCI;

the priority of the first UCI is the same as or different from the priority of the second HARQ-ACK information.

For example: when the first UCI is first SR information, the first SR information and the second HARQ-ACK information correspond to priority level 1 or URLLC service or high priority service, and the second SR information corresponds to priority level 2 or eMBB service or low priority service; or the first SR information, the second HARQ-ACK information, and the second SR information all correspond to the same priority or service type priority, such as: all corresponding to priority level 1 or URLLC traffic or high priority traffic, or all corresponding to priority level 2 or eMBB traffic or low priority traffic. The priority level 1 is higher than priority level 2.

Scenario four: when the first UCI is SR or HARQ-ACK or first CSI, the second UCI is second CSI, and the third UCI is third CSI:

determining that low priority CSI among the second CSI and the third CSI is dropped if PUCCH resources for simultaneously transmitting the second CSI and the third CSI overlap PUCCH resources for transmitting the SR or HARQ-ACK or the first CSI.

The third CSI has a lower priority than the second CSI. For example, when the first UCI is SR information, the SR corresponds to a priority level 1 or URLLC service or a high priority service type, or the SR corresponds to a priority level 2 or eMBB service or a low priority service type. Where priority level 1 is higher than priority level 2.

Scenario five: when the first UCI is SR or HARQ-ACK or first CSI, the second UCI is second CSI, and the third UCI is third CSI:

if the PUCCH resources used for simultaneously transmitting the second CSI and the third CSI are overlapped with the PUCCH resources used for carrying the SR, HARQ-ACK or the first CSI and the priorities of the second CSI and the third CSI are the same, determining that one or any one of the second CSI and the third CSI is dropped. For example: dropping the one of the second CSI and the third CSI with the earliest transmission time or the one with the latest transmission time in particular, any one of the second UCI and the third UCI may be dropped when the transmission timings are aligned, such as: the third UCI is dropped directly.

Seventh Embodiment

The fifth embodiment and the sixth embodiment are respectively described in terms of a UCI method of processing the present disclosure, and the embodiments will be further described with reference to the accompanying drawings.

Specifically, as shown in FIG. 7, an embodiment of the present disclosure provides a base station 700, including:

a processing module 710, configured to, when a first physical uplink control channel PUCCH resource carrying first UCI is not overlapped with a second PUCCH resource carrying second UCI in a time domain, the first PUCCH resource is not overlapped with a third PUCCH resource carrying third UCI in the time domain, and the second PUCCH resource and the third PUCCH resource overlap in the time domain: determining that a first target UCI is dropped if a fourth PUCCH resource for simultaneously transmitting the second UCI and the third UCI is overlapped with the first PUCCH resource; where the first target UCI is one of second UCI and the third UCI.

Optionally, the terminal 700 further includes:

determining module, configured to, when the first PUCCH resource is not overlapped with the second PUCCH resource in time domain, the first PUCCH resource is not overlapped with the third PUCCH resource in time domain, and the second PUCCH resource and the third PUCCH resource overlap in time domain, determine a fourth PUCCH resource for simultaneously transmitting the second UCI and the third UCI according to a predefined multiplexing transmission rule;

a judging module, configured to judge whether the fourth PUCCH resource and the first PUCCH resource are overlapped in the time domain.

Optionally, the processing module 710 includes:

a processing unit, configured to determine that a first target UCI is dropped if there is positive SR information transmission when the first UCI is scheduling request, SR, information.

Optionally, the first target UCI is: a low priority UCI in the second and third UCI;

or, in a case that one of the second UCI and the third UCI is channel state information (CSI), the first target UCI includes: one of the second UCI and the third UCI which is CSI;

or, when the second UCI and the third UCI are both CSI and have the same priority as the third UCI, the first target UCI includes: a predetermined one or any one of the second UCI and the third UCI;

or, the first target UCI includes: the third UCI.

Optionally, the UCI of low priority is: the UCI with low priority is corresponding to the UCI with low priority level, or the UCI with low priority level is corresponding to the UCI of enhanced mobile broadband (eMBB) service, or the UCI corresponding to a lower priority service.

Optionally, the first UCI is at least one of SR information, CSI, and hybrid automatic repeat request acknowledgment HARQ-ACK information;

the second UCI is at least one of SR information, CSI and HARQ-ACK information;

the third UCI is at least one of SR information, CSI and HARQ-ACK information.

Optionally, the priority of the first UCI is higher than or equal to the priority of the third UCI; the priority of the second UCI is higher than or equal to the priority of the third UCI; the priority of the first UCI is the same as or different from the priority of the second UCI;

the priority is: corresponding UCI priority, or corresponding priority level, or corresponding service type, or corresponding priority of service type.

Optionally, the processing module 710 is specifically configured to at least one of:

when the first UCI is SR or first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, determining that the second CSI is dropped;

when the first UCI is SR or first HARQ-ACK or CSI, the second UCI is second HARQ-ACK, and the third UCI is third HARQ-ACK, if PUCCH resources used for simultaneously transmitting the second HARQ-ACK and the third HARQ-ACK are overlapped with PUCCH resources used for carrying the SR or the first HARQ-ACK or CSI, the third HARQ-ACK is determined to be dropped, where the priority of the third HARQ-ACK is lower than that of the second HARQ-ACK, and the priority of the third HARQ-ACK is lower than that of the first UCI;

when the first UCI is a first SR or a first HARQ-ACK or CSI, the second UCI is a second HARQ-ACK, and the third UCI is a second SR, if PUCCH resources used for simultaneously transmitting the second HARQ-ACK and the second SR are overlapped with PUCCH resources used for transmitting the first SR or the first HARQ-ACK or CSI, determining that the second SR is dropped, where the priority of the second SR is lower than or equal to that of the second HARQ-ACK, and the priority of the second SR is lower than or equal to that of the first UCI;

when the first UCI is SR or HARQ-ACK or first CSI, the second UCI is second CSI, and the third UCI is third CSI, if PUCCH resources used for simultaneously transmitting the second CSI and the third CSI are overlapped with PUCCH resources used for transmitting the SR or HARQ-ACK or the first CSI, determining that low-priority CSI in the second CSI and the third CSI is dropped, where the priority of the third CSI is lower than the low priority of the second CSI;

when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and the priorities of the second CSI and the third CSI are the same, determining that a predetermined one or any one of the second CSI and the third CSI is dropped.

The embodiment of the base station of the present disclosure corresponds to the embodiment of the method, and all implementation means in the embodiment of the method are applicable to the embodiment of the base station, and the same technical effect can be achieved.

In the base station 700 in this embodiment of the disclosure, when a first PUCCH resource carrying first UCI and a second PUCCH resource carrying second UCI do not overlap in a time domain, the first PUCCH resource and a third PUCCH resource carrying third UCI do not overlap in the time domain, and the second PUCCH resource and the third PUCCH resource overlap in the time domain: if a fourth PUCCH resource for simultaneously transmitting the second UCI and the third UCI is overlapped with the first PUCCH resource, determining that the first target UCI is dropped, so as to receive the first UCI on the first PUCCH resource, and receiving the second UCI on a PUCCH resource corresponding to the second target UCI (the other one of the second UCI and the third UCI except the first target UCI), so as to avoid that UCI carried by PUCCH resources (the first PUCCH resource and the second PUCCH resource, the first PUCCH resource and the third PUCCH resource) which are originally not overlapped needs to be transmitted on one PUCCH resource due to overlapping of the second PUCCH resource and the third PUCCH resource, thereby avoiding affecting transmission delay and transmission performance of the first UCI and the second UCI.

Eighth Embodiment

In order to better achieve the above object, as shown in FIG. 8, a fourth embodiment of the present disclosure further provides a base station, including: a processor 800; a memory 820 connected to the processor 800 through a bus interface, and a transceiver 810 connected to the processor 800 through a bus interface; the memory 820 is used for storing programs and data used by the processor in performing operations; transmitting data information or pilot through the transceiver 810, and also receiving an uplink control channel through the transceiver 810; when the processor 800 calls and executes the programs and data stored in the memory 820, the following functions are implemented.

In particular, the processor 800, when executing the computer program, implements the following steps:

when a first Physical Uplink Control Channel (PUCCH) resource carrying first UCI and a second PUCCH resource carrying second UCI are not overlapped in a time domain, the first PUCCH resource is not overlapped in the time domain with a third PUCCH resource carrying third UCI, and the second PUCCH resource and the third PUCCH resource are overlapped in the time domain:

determining that a first target UCI is dropped if a fourth PUCCH resource for simultaneously transmitting the second UCI and the third UCI is overlapped with the first PUCCH resource;

the first target UCI is one of second UCI and the third UCI.

The processor 800, when executing the computer program, further implements the steps of:

when the first PUCCH resource is not overlapped with the second PUCCH resource in the time domain, the first PUCCH resource is not overlapped with the third PUCCH resource in the time domain, and the second PUCCH resource and the third PUCCH resource are overlapped in the time domain:

determining a fourth PUCCH resource for simultaneously transmitting the second UCI and the third UCI according to a predefined multiplexing transmission rule; and judging whether the fourth PUCCH resource and the first PUCCH resource are overlapped in the time domain.

The processor 800, when executing the computer program, further implements the steps of:

when the first UCI is Scheduling Request (SR) information, if positive SR information transmission exists, determining that the first target UCI is dropped.

The first target UCI is: a low priority UCI in the second and third UCI;

or, in a case that one of the second UCI and the third UCI is channel state information (CSI), the first target UCI includes: one of the second UCI and the third UCI which is CSI;

or, when the second UCI and the third UCI are both CSI and have the same priority as the third UCI, the first target UCI includes: a predetermined one or any one of the second UCI and the third UCI;

or, the first target UCI includes: the third UCI.

The low priority UCI is: the UCI with low priority is corresponding to the UCI with low priority level, or the UCI with low priority level is corresponding to the UCI of enhanced mobile broadband (eMBB) service, or the UCI corresponding to a lower priority service.

The first UCI is at least one of SR information, CSI and hybrid automatic repeat request-acknowledgment (HARQ-ACK) information;

the second UCI is at least one of SR information, CSI and HARQ-ACK information;

the third UCI is at least one of SR information, CSI and HARQ-ACK information.

A priority of the first UCI is higher than or equal to a priority of the third UCI; the priority of the second UCI is higher than or equal to the priority of the third UCI, the priority of the first UCI is the same as or different from the priority of the second UCI;

the priority is: corresponding UCI priority, or corresponding priority level, or corresponding service type, or corresponding priority of service type.

The processor 800, when executing the computer program, further performs at least one of the following steps:

when the first UCI is SR or first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, determining that the second CSI is dropped;

when the first UCI is SR or first HARQ-ACK or CSI, the second UCI is second HARQ-ACK, and the third UCI is third HARQ-ACK, if PUCCH resources used for simultaneously transmitting the second HARQ-ACK and the third HARQ-ACK are overlapped with PUCCH resources used for carrying the SR or the first HARQ-ACK or CSI, the third HARQ-ACK is determined to be dropped, where the priority of the third HARQ-ACK is lower than that of the second HARQ-ACK, and the priority of the third HARQ-ACK is lower than that of the first UCI;

when the first UCI is a first SR or a first HARQ-ACK or CSI, the second UCI is a second HARQ-ACK, and the third UCI is a second SR, if PUCCH resources used for simultaneously transmitting the second HARQ-ACK and the second SR are overlapped with PUCCH resources used for transmitting the first SR or the first HARQ-ACK or CSI, determining that the second SR is dropped, where the priority of the second SR is lower than or equal to that of the second HARQ-ACK, and the priority of the second SR is lower than or equal to that of the first UCI;

when the first UCI is SR or HARQ-ACK or first CSI, the second UCI is second CSI, and the third UCI is third CSI, if PUCCH resources used for simultaneously transmitting the second CSI and the third CSI are overlapped with PUCCH resources used for transmitting the SR or HARQ-ACK or the first CSI, determining that low-priority CSI in the second CSI and the third CSI is dropped, where the priority of the third CSI is lower than the low priority of the second CSI;

when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and the priorities of the second CSI and the third CSI are the same, determining that a predetermined one or any one of the second CSI and the third CSI is dropped.

A transceiver 810 for receiving and transmitting data under the control of the processor 800.

In FIG. 8 the bus architecture may include any number of interconnected buses and bridges, with one or more processors represented by processor 800 and various circuits of memory represented by memory 820 being linked together. The bus architecture may also link together various other circuits such as peripherals, voltage regulators, power management circuits, and the like, which are well known in the art, and therefore, will not be described any further herein. The bus interface provides an interface. The transceiver 810 may be a number of elements, including a transmitter and a transceiver, providing a means for communicating with various other apparatus over a transmission medium. The processor 800 is responsible for managing the bus architecture and general processing, and the memory 820 may store data used by the processor 800 in performing operations.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium.

The embodiments of the present disclosure further provide a computer-readable storage medium, where a computer program is stored in the computer-readable storage medium, and when the computer program is executed by a processor, the computer program implements each process of the embodiment of the method for processing UCI on the terminal side, and can achieve the same technical effect, and in order to avoid repetition, the computer program is not described herein again. The computer-readable storage medium may be a Read-Only Memory (ROM), a Random Access Memory (RAM), a magnetic disk or an optical disk.

The following specifically describes the method of processing UCI at the terminal side and the base station side with reference to specific examples:

one PUCCH resource carrying HARQ-ACK information (second UCI) and one PUCCH resource carrying CSI (third UCI) overlap in the time domain, there is also one PUCCH resource carrying SR information (first UCI) and one PUCCH resource carrying the HARQ-ACK information that do not overlap in the time domain, and there is also one PUCCH resource carrying the SR information and one PUCCH resource carrying the CSI that do not overlap in the time domain, as shown in FIG. 9. SR in FIG. 9 denotes PUCCH resources carrying SR information; HARQ-ACK represents PUCCH resources carrying HARQ-ACK information; CSI denotes PUCCH resources carrying CSI.

Because the PUCCH resource carrying the CSI and the PUCCH resource carrying the CSI overlap in the time domain, a PUCCH resource for simultaneously transmitting the HARQ-ACK information and the CSI is determined according to the multiplexing transmission rule predefined in the above embodiment (in this embodiment, the PUCCH resource supporting the simultaneous transmission of the HARQ-ACK information and the CSI may be configured, otherwise, the CSI is directly dropped, thereby avoiding the overlap between the HARQ-ACK information and the CSI).

Figure 10:
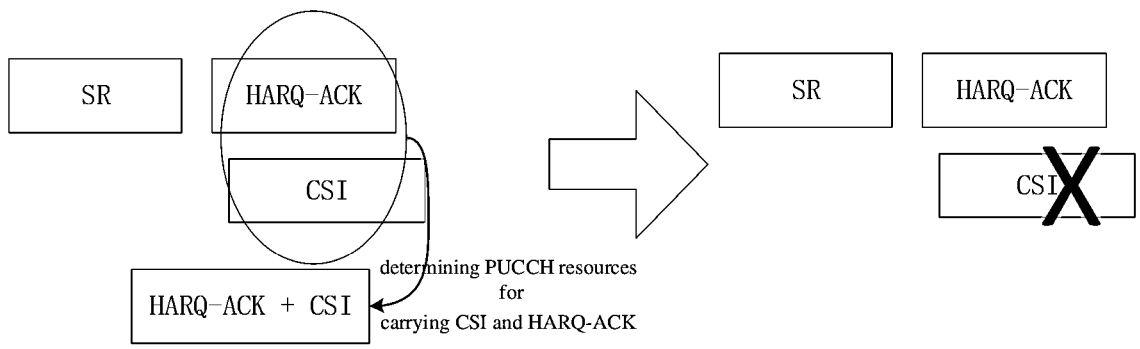
FIG. 10 is a schematic diagram of transmitting first UCI and second UCI according to an embodiment of the present disclosure.

That is, the following cases exist for the terminal side:

case 1: when the HARQ-ACK information has a corresponding PDCCH (specifically, the same as the above-mentioned part of the terminal-side embodiment, which is not described herein again), at this time, the terminal is configured with a plurality of PUCCH resource sets, and a PUCCH resource set is determined according to the total bit number of the HARQ-ACK information and CSI, and a PUCCH resource is determined in the determined PUCCH resource set according to the PDCCH corresponding to the HARQ-ACK information (specifically, a PUCCH resource indication field in DCI used by the PDCCH), where the PUCCH resource is a PUCCH resource for simultaneously transmitting the HARQ-ACK information and the CSI;

if the PUCCH resource for simultaneously transmitting the HARQ-ACK information and the CSI is overlapped with the PUCCH resource corresponding to the SR information in the time domain, the CSI is directly dropped, so that it is avoided that the HARQ-ACK information and the SR information, which are originally not overlapped, need to be transmitted in a multiplexing manner (i.e., transmitted on the same resource) due to the overlapping of the CSI and the HARQ-ACK information, that is, the terminal transmits the HARQ-ACK information on the PUCCH resource corresponding to the HARQ-ACK information at this time, and transmits the SR information on the PUCCH resource corresponding to the SR information, that is, the HARQ-ACK information and the SR information are respectively transmitted in a TDM manner, as shown in FIG. 10. Where, SR in FIG. 10 denotes PUCCH resource carrying SR information; HARQ-ACK represents PUCCH resources carrying HARQ-ACK information; the CSI represents PUCCH resources carrying the CSI; HARQ-ACK+CSI denotes a PUCCH resource for simultaneous transmission of HARQ-ACK information and CSI.

Figure 11:
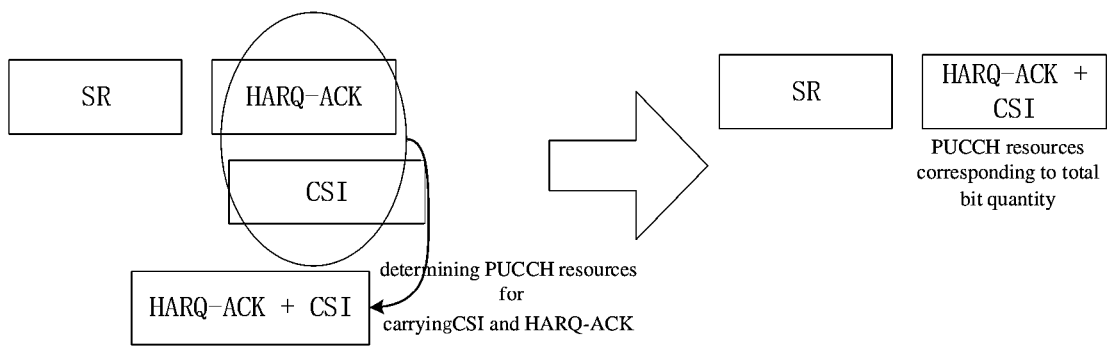
FIG. 11 is a first schematic diagram of transmitting first UCI, second UCI, and third UCI according to an embodiment of the present disclosure.

If the PUCCH resource for simultaneously transmitting HARQ-ACK information and CSI is not overlapped with the PUCCH resource corresponding to SR information in the time domain, the HARQ-ACK information and CSI may be simultaneously transmitted on the PUCCH resource for simultaneously transmitting HARQ-ACK information and CSI, and SR information may be transmitted on the PUCCH resource corresponding to SR information, as shown in FIG. 11. Where, SR in FIG. 11 represents PUCCH resource carrying SR information; HARQ-ACK represents PUCCH resources carrying HARQ-ACK information; the CSI represents PUCCH resources carrying the CSI; HARQ-ACK+CSI denotes a PUCCH resource for simultaneous transmission of HARQ-ACK information and CSI.

Figure 12:
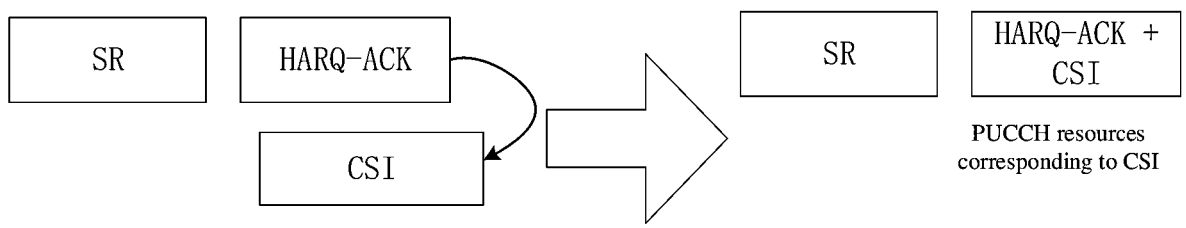
FIG. 12 is a second schematic diagram of transmitting the first UCI, the second UCI, and the third UCI according to an embodiment of the present disclosure.

Case 2: when the HARQ-ACK information does not have a corresponding PDCCH (specifically, the same as the above-mentioned part of the terminal-side embodiment, which is not described herein), that is, the HARQ-ACK information is feedback information of an SPS PDSCH, the HARQ-ACK information is transferred to a PUCCH resource corresponding to CSI to implement simultaneous transmission with the CSI, that is, the PUCCH resource corresponding to the CSI is a PUCCH resource for simultaneously transmitting the HARQ-ACK and the CSI at this time; then, since the PUCCH resource corresponding to CSI originally is not overlapped with the PUCCH resource corresponding to SR information, separate transmission may be implemented, that is, HARQ-ACK information and CSI are transmitted simultaneously on the PUCCH resource corresponding to CSI, and SR information is transmitted on the PUCCH resource corresponding to SR information, as shown in FIG. 12. Where, SR in FIG. 12 represents PUCCH resource carrying SR information; HARQ-ACK represents PUCCH resources carrying HARQ-ACK information; the CSI represents PUCCH resources carrying the CSI; HARQ-ACK+CSI denotes a PUCCH resource for simultaneous transmission of HARQ-ACK information and CSI.

For the base station side, whether the terminal transmits the CSI is determined according to the method, so that how to receive the CSI is determined; namely:

when the HARQ-ACK information has a corresponding PDCCH, when the PUCCH resource used for simultaneously transmitting the HARQ-ACK information and the CSI is overlapped with the PUCCH resource corresponding to the SR information in the time domain, determining that the CSI is dropped, further receiving the HARQ-ACK information on the PUCCH resource corresponding to the HARQ-ACK information, and receiving the SR information on the PUCCH resource corresponding to the SR information; and if the PUCCH resource for simultaneously transmitting the HARQ-ACK information and the CSI is not overlapped with the PUCCH resource corresponding to the SR information in the time domain, determining that the HARQ-ACK information and the CSI are received on the PUCCH resource for simultaneously transmitting the HARQ-ACK information and the CSI, and receiving the SR information on the PUCCH resource corresponding to the SR information.

When the HARQ-ACK information does not have the corresponding PDCCH, receiving the HARQ-ACK information and the CSI on the PUCCH resource corresponding to the CSI, and receiving the SR information on the PUCCH resource corresponding to the SR information.

In the above situation, before determining PUCCH resources for transmitting HARQ-ACK information and CSI simultaneously, it may be determined whether a time condition is satisfied, and if the time condition is satisfied, the above operation is performed, and if the time condition is not satisfied, it is considered that scheduling is wrong, or CSI is directly dropped; of course, it may also be agreed that the time condition is not determined, and multiplexing transmission may always be performed by default, so as to directly execute the above steps, which is not specifically limited in the present disclosure.

In the above case, the SR information may correspond to a URLLC service, the HARQ-ACK information may correspond to a URLLC service or an eMBB service, the CSI may correspond to an eMBB service or the CSI does not distinguish the corresponding service type, and the priority of the CSI is the lowest; of course, the method is also applicable to the case where the URLLC service and the eMBB service are replaced with two different service types;

in the above case, any SR information state, such as positive (positive) SR and negative (negative) SR, may be applied, that is, the SR information state is not distinguished, as long as the PUCCH resource corresponding to the SR information exists; the method can also be applied only to the positive SR information, that is, the processing is performed according to the above manner only when the SR information is the positive SR information, and if the SR information is negative, it is not considered that there is a collision with the PUCCH resource for simultaneously transmitting the HARQ-ACK and the CSI in case 1, and the HARQ-ACK and the CSI are directly transmitted on the resource for simultaneously transmitting the HARQ-ACK and the CSI;

In the above situation, the relative positions of the SR information and the HARQ-ACK information and the CSI are merely examples, where the starting position of the PUCCH resource corresponding to the CSI leads or lags or aligns the starting position of the PUCCH resource corresponding to the HARQ-ACK information, the ending position of the PUCCH resource corresponding to the CSI may lead or lags or aligns the ending position of the PUCCH resource corresponding to the HARQ-ACK information, and the PUCCH resource corresponding to the SR information may be before the PUCCH resource corresponding to the HARQ-ACK information and the CSI or after the PUCCH resource corresponding to the HARQ-ACK information and the CSI, which is not limited by the disclosure.

Further, it is noted that in the apparatus and method of the present disclosure, it is apparent that each component or each step may be decomposed and/or recombined. Such decomposition and/or recombination should be considered as equivalents of the present disclosure. Also, the steps of performing the series of processes described above may naturally be performed chronologically in the order described, but need not necessarily be performed chronologically, and some steps may be performed in parallel or independently of each other. It will be understood by those of ordinary skill in the art that all or any of the steps or elements of the methods and apparatus of the present disclosure may be implemented in any computing device (including processors, storage media, etc.) or network of computing devices, in hardware, firmware, software, or any combination thereof, which may be implemented by those of ordinary skill in the art using their basic programming skills after reading the description of the present disclosure.

Thus, the objects of the present disclosure may also be achieved by running a program or a set of programs on any computing device. The computing device may be a well-known general purpose device. Thus, the objects of the present disclosure can also be achieved merely by providing a program product containing program code for implementing the method or apparatus. That is, such a program product also constitutes the present disclosure, and a storage medium storing such a program product also constitutes the present disclosure. It is to be understood that such storage media can be any known storage media or any storage media developed in the future. It is also noted that in the apparatus and methods of the present disclosure, it is apparent that the components or steps may be broken down and/or re-combined. Such decomposition and/or recombination should be considered as equivalents of the present disclosure. Also, the steps of executing the series of processes described above may naturally be executed chronologically in the order described, but need not necessarily be executed chronologically. Some steps may be performed in parallel or independently of each other.

It is to be understood that the embodiments described in connection with the embodiments of the present disclosure may be implemented in hardware, software, firmware, middleware, microcode, or a combination thereof. For a hardware implementation, the units, modules, sub-units, and sub-modules may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose processors, controllers, micro-controllers, microprocessors, other electronic units designed to perform the functions described in this disclosure, or a combination thereof.

For a software implementation, the techniques described in the embodiments of the present disclosure may be implemented with modules (e.g., procedures, functions, and so on) that perform the functions described in the embodiments of the present disclosure. The software codes may be stored in a memory and executed by a processor. The memory may be implemented within the processor or external to the processor.

While the foregoing is directed to alternative embodiments of the present disclosure, it will be appreciated by those skilled in the art that various changes and modifications may be made therein without departing from the principles of the disclosure, and it is intended that such changes and modifications be covered by the scope of the disclosure.

What is claimed is:

1. A method of processing uplink control information (UCI), performed by a terminal and comprising:

when a first Physical Uplink Control Channel (PUCCH) resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain, dropping only a first target UCI and transmitting a second target UCI on a PUCCH resource corresponding to the second target UCI when a fourth PUCCH resource for simultaneously transmitting the second UCI and the third UCI is overlapped with the first PUCCH resource, wherein the first target UCI is one of the second UCI and the third UCI and the second target UCI is the other one of the second UCI and the third UCI except the first target UCI.

2. The method according to claim 1, further comprising: determining the fourth PUCCH resource for simultaneously transmitting the second UCI and the third UCI according to a predefined multiplexing transmission rule.

3. The method according to claim 1, wherein the dropping the first target UCI comprises:
when the first UCI is Scheduling Request (SR) information, if a positive SR information transmission exists, dropping the first target UCI.

4. The method according to claim 1, wherein the first target UCI is one of the following UCI:
the first target UCI is a UCI with a lower priority in the second UCI and the third UCI; or
when one of the second UCI and the third UCI is channel state information (CSI), the first target UCI is one of the second UCI and the third UCI which is CSI; or
when the second UCI and the third UCI are both CSI and the priorities of the second UCI and the third UCI are the same, the first target UCI is a predetermined one or any one of the second UCI and the third UCI; or
the first target UCI is the third UCI;
wherein the UCI with the lower priority is: UCI with a lower UCI priority, UCI corresponding to a lower priority level, UCI corresponding to an enhanced mobile broadband (eMBB) service, or UCI corresponding to a lower priority service;
and/or
a priority of the first UCI is higher than or equal to a priority of the third UCI; a priority of the second UCI is higher than or equal to the priority of the third UCI; the first UCI and the second UCI correspond to the same or different priorities;
wherein the priority is: a corresponding UCI priority, or a corresponding priority level, or a corresponding service type, or a corresponding priority of service type.

5. The method according to claim 1, wherein dropping the first target UCI when the fourth PUCCH resource for simultaneously transmitting the second UCI and the third UCI is overlapped with the first PUCCH resource when the first PUCCH resource carrying first UCI and the second PUCCH resource carrying second UCI are not overlapped in the time domain, the first PUCCH resource is not overlapped with the third PUCCH resource carrying third UCI in the time domain, and the second PUCCH resource and the third PUCCH resource are overlapped in the time domain comprises at least one of:
when the first UCI is SR or a first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, dropping the second CSI;
when the first UCI is SR or a first HARQ-ACK or CSI, the second UCI is a second HARQ-ACK, and the third UCI is a third HARQ-ACK, if PUCCH resources for simultaneously transmitting the second HARQ-ACK and the third HARQ-ACK are overlapped with PUCCH resources for carrying the SR or the first HARQ-ACK or CSI, dropping the third HARQ-ACK, wherein a priority of the third HARQ-ACK is lower than a priority of the second HARQ-ACK, and the priority of the third HARQ-ACK is lower than a priority of the first UCI;
when the first UCI is a first SR or a first HARQ-ACK or CSI, the second UCI is a second HARQ-ACK, and the third UCI is a second SR, if PUCCH resources for simultaneously transmitting the second HARQ-ACK and the second SR are overlapped with PUCCH resources for transmitting the first SR or the first HARQ-ACK or CSI, dropping the second SR, wherein a priority of the second SR is lower than or equal to a priority of the second HARQ-ACK, and the priority of the second SR is lower than or equal to a priority of the first UCI;
when the first UCI is SR or HARQ-ACK or first CSI, the second UCI is second CSI and the third UCI is third CSI, if PUCCH resources for simultaneously transmitting the second CSI and the third CSI are overlapped with PUCCH resources for transmitting the SR or HARQ-ACK or the first CSI, dropping CSI with a lower priority in the second CSI and the third CSI, wherein a priority of the third CSI is lower than a priority of the second CSI; or
when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and priorities of the second CSI and the third CSI are the same, dropping a predetermined one or any one of the second CSI and the third CSI.

6. A terminal, comprising: a transceiver, a memory, a processor, and a computer program stored in the memory and executable on the processor, wherein the processor is configured to execute the computer program to perform:
when a first Physical Uplink Control Channel (PUCCH) resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain,
dropping only a first target UCI and transmitting a second target UCI on a PUCCH resource corresponding to the second target UCI when a fourth PUCCH resource for simultaneously transmitting the second UCI and the third UCI is overlapped with the first PUCCH resource, wherein the first target UCI is one of the second UCI and the third UCI and the second target UCI is the other one of the second UCI and the third UCI except the first target UCI.

7. The terminal according to claim 6, wherein the processor is configured to execute the computer program to perform:
   determining the fourth PUCCH resource for simultaneously transmitting the second UCI and the third UCI according to a predefined multiplexing transmission rule.

8. The terminal according to claim 6, wherein the processor is configured to execute the computer program to perform:
   when the first UCI is Scheduling Request (SR) information, if a positive SR information transmission exists, dropping the first target UCI.

9. The terminal according to claim 6, wherein the first target UCI is one of the following UCI:
   the first target UCI is a UCI with a lower priority in the second UCI and the third UCI; or
   when one of the second UCI and the third UCI is channel state information (CSI), the first target UCI is one of the second UCI and the third UCI which is CSI; or
   when the second UCI and the third UCI are both CSI and the priorities of the second UCI and the third UCI are the same, the first target UCI is a predetermined one or any one of the second UCI and the third UCI; or
   the first target UCI is the third UCI;
   wherein the UCI with the lower priority is: UCI with a lower UCI priority, UCI corresponding to a lower priority level, UCI corresponding to an enhanced mobile broadband (eMBB) service, or UCI corresponding to a lower priority service;
   and/or
   a priority of the first UCI is higher than or equal to a priority of the third UCI; a priority of the second UCI is higher than or equal to the priority of the third UCI; the first UCI and the second UCI correspond to the same or different priorities;
   wherein the priority is: a corresponding UCI priority, or a corresponding priority level, or a corresponding service type, or a corresponding priority of service type.

10. The terminal according to claim 6, wherein the processor is configured to execute the computer program to perform:
    when the first UCI is SR or a first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, dropping the second CSI;
    when the first UCI is SR or a first HARQ-ACK or CSI, the second UCI is a second HARQ-ACK, and the third UCI is a third HARQ-ACK, if PUCCH resources for simultaneously transmitting the second HARQ-ACK and the third HARQ-ACK are overlapped with PUCCH resources for carrying the SR or the first HARQ-ACK or CSI, dropping the third HARQ-ACK, wherein a priority of the third HARQ-ACK is lower than a priority of the second HARQ-ACK, and the priority of the third HARQ-ACK is lower than a priority of the first UCI;
    when the first UCI is a first SR or a first HARQ-ACK or CSI, the second UCI is a second HARQ-ACK, and the third UCI is a second SR, if PUCCH resources for simultaneously transmitting the second HARQ-ACK and the second SR are overlapped with PUCCH resources for transmitting the first SR or the first HARQ-ACK or CSI, dropping the second SR, wherein a priority of the second SR is lower than or equal to a priority of the second HARQ-ACK, and the priority of the second SR is lower than or equal to a priority of the first UCI;
    when the first UCI is SR or HARQ-ACK or first CSI, the second UCI is second CSI and the third UCI is third CSI, if PUCCH resources for simultaneously transmitting the second CSI and the third CSI are overlapped with PUCCH resources for transmitting the SR or HARQ-ACK or the first CSI, dropping CSI with a lower priority in the second CSI and the third CSI, wherein a priority of the third CSI is lower than a priority of the second CSI; or
    when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and priorities of the second CSI and the third CSI are the same, dropping a predetermined one or any one of the second CSI and the third CSI.

11. A method of processing uplink control information (UCI), performed by a base station and comprising:
    when a first Physical Uplink Control Channel (PUCCH) resource carrying first UCI and a second PUCCH resource carrying second UCI are not overlapped in a time domain, the first PUCCH resource is not overlapped with a third PUCCH resource carrying third UCI in the time domain, and the second PUCCH resource and the third PUCCH resource are overlapped in the time domain,
    determining that only first target UCI is dropped second target UCI is transmitted on a PUCCH resource corresponding to the second target UCI when a fourth PUCCH resource for simultaneously transmitting the second UCI and the third UCI is overlapped with the first PUCCH resource, wherein the first target UCI is one of the second UCI and the third UCI and the second target UCI is the other one of the second UCI and the third UCI except the first target UCI.

12. The method according to claim 11, further comprising:
    determining the fourth PUCCH resource for simultaneously transmitting the second UCI and the third UCI according to a predefined multiplexing transmission rule.

13. The method according to claim 11, wherein the determining that the first target UCI is dropped comprises:
    when the first UCI is Scheduling Request (SR) information, if a positive SR information transmission exists, determining that the first target UCI is dropped.

14. The method according to claim 11, wherein the first target UCI is one of the following UCI:
    the first target UCI is a UCI with a lower priority in the second UCI and the third UCI; or
    when one of the second UCI and the third UCI is channel state information (CSI), the first target UCI is one of the second UCI and the third UCI which is CSI; or
    when the second UCI and the third UCI are both CSI and the priorities of the second UCI and the third UCI are the same, the first target UCI is a predetermined one or any one of the second UCI and the third UCI; or
    the first target UCI is the third UCI;
    wherein the UCI with the lower priority is: UCI with a lower UCI priority, UCI corresponding to a lower priority level, UCI corresponding to an enhanced mobile broadband (eMBB) service, or UCI corresponding to a lower priority service;

and/or a priority of the first UCI is higher than or equal to a priority of the third UCI; a priority of the second UCI is higher than or equal to the priority of the third UCI; the first UCI and the second UCI correspond to the same or different priorities;

wherein the priority is: a corresponding UCI priority, or a corresponding priority level, or a corresponding service type, or a corresponding priority of service type.

15. The method according to claim 11, wherein the determining that the first target UCI is dropped when the fourth PUCCH resource for simultaneously transmitting the second UCI and the third UCI is overlapped with the first PUCCH resource when the first PUCCH resource carrying first UCI and the second PUCCH resource carrying second UCI are not overlapped in the time domain, the first PUCCH resource is not overlapped with the third PUCCH resource carrying third UCI in the time domain, and the second PUCCH resource and the third PUCCH resource are overlapped in the time domain comprises at least one of:

when the first UCI is SR or a first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, determining that the second CSI is dropped;

when the first UCI is SR or a first HARQ-ACK or CSI, the second UCI is a second HARQ-ACK, and the third UCI is a third HARQ-ACK, if PUCCH resources for simultaneously transmitting the second HARQ-ACK and the third HARQ-ACK are overlapped with PUCCH resources for carrying the SR or the first HARQ-ACK or CSI, determining that the third HARQ-ACK is dropped, wherein a priority of the third HARQ-ACK is lower than a priority of the second HARQ-ACK, and the priority of the third HARQ-ACK is lower than a priority of the first UCI;

when the first UCI is a first SR or a first HARQ-ACK or CSI, the second UCI is a second HARQ-ACK, and the third UCI is a second SR, if PUCCH resources for simultaneously transmitting the second HARQ-ACK and the second SR are overlapped with PUCCH resources for transmitting the first SR or the first HARQ-ACK or CSI, determining that the second SR is dropped, wherein a priority of the second SR is lower than or equal to a priority of the second HARQ-ACK, and the priority of the second SR is lower than or equal to a priority of the first UCI;

when the first UCI is SR or HARQ-ACK or first CSI, the second UCI is second CSI and the third UCI is third CSI, if PUCCH resources for simultaneously transmitting the second CSI and the third CSI are overlapped with PUCCH resources for transmitting the SR or HARQ-ACK or the first CSI, determining that CSI with a lower priority in the second CSI and the third CSI is dropped, wherein a priority of the third CSI is lower than a priority of the second CSI; or when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and priorities of the second CSI and the third CSI are the same, determining that a predetermined one or any one of the second CSI and the third CSI is dropped.

16. A base station, comprising: a transceiver, a memory, a processor, and a computer program stored in the memory and executable on the processor, wherein the processor is configured to execute the computer program to perform the method of processing UCI according to claim 11.

17. The base station according to claim 16, wherein the processor is configured to execute the computer program to perform:

determining the fourth PUCCH resource for simultaneously transmitting the second UCI and the third UCI according to a predefined multiplexing transmission rule.

18. The base station according to claim 16, wherein the processor is configured to execute the computer program to perform:

when the first UCI is Scheduling Request (SR) information, if a positive SR information transmission exists, determining that the first target UCI is dropped.

19. The base station according to claim 16, wherein the first target UCI is one of the following UCI:

the first target UCI is a UCI with a lower priority in the second UCI and the third UCI; or when one of the second UCI and the third UCI is channel state information (CSI), the first target UCI is one of the second UCI and the third UCI which is CSI; or when the second UCI and the third UCI are both CSI and the priorities of the second UCI and the third UCI are the same, the first target UCI is a predetermined one or any one of the second UCI and the third UCI; or the first target UCI is the third UCI;

wherein the UCI with the lower priority is: UCI with a lower UCI priority, UCI corresponding to a lower priority level, UCI corresponding to an enhanced mobile broadband (eMBB) service, or UCI corresponding to a lower priority service;

and/or a priority of the first UCI is higher than or equal to a priority of the third UCI; a priority of the second UCI is higher than or equal to the priority of the third UCI; the first UCI and the second UCI correspond to the same or different priorities;

wherein the priority is: a corresponding UCI priority, or a corresponding priority level, or a corresponding service type, or a corresponding priority of service type.

20. The base station according to claim 16, wherein the processor is configured to execute the computer program to perform at least one of:

when the first UCI is SR or a first HARQ-ACK or first CSI, the second UCI is second HARQ-ACK, and the third UCI is second CSI, if PUCCH resources for simultaneously transmitting the second HARQ-ACK and the second CSI are overlapped with PUCCH resources for carrying the SR or the first HARQ-ACK or the first CSI, determining that the second CSI is dropped;

when the first UCI is SR or a first HARQ-ACK or CSI, the second UCI is a second HARQ-ACK, and the third UCI is a third HARQ-ACK, if PUCCH resources for simultaneously transmitting the second HARQ-ACK and the third HARQ-ACK are overlapped with PUCCH resources for carrying the SR or the first HARQ-ACK or CSI, determining that the third HARQ-ACK is dropped, wherein a priority of the third HARQ-ACK is lower than a priority of the second HARQ-ACK, and the priority of the third HARQ-ACK is lower than a priority of the first UCI;

when the first UCI is a first SR or a first HARQ-ACK or CSI, the second UCI is a second HARQ-ACK, and the third UCI is a second SR, if PUCCH resources for simultaneously transmitting the second HARQ-ACK and the second SR are overlapped with PUCCH resources for transmitting the first SR or the first HARQ-ACK or CSI, determining that the second SR is dropped, wherein a priority of the second SR is lower than or equal to a priority of the second HARQ-ACK, and the priority of the second SR is lower than or equal to a priority of the first UCI;

when the first UCI is SR or HARQ-ACK or first CSI, the second UCI is second CSI and the third UCI is third CSI, if PUCCH resources for simultaneously transmitting the second CSI and the third CSI are overlapped with PUCCH resources for transmitting the SR or HARQ-ACK or the first CSI, determining that CSI with a lower priority in the second CSI and the third CSI is dropped, wherein a priority of the third CSI is lower than a priority of the second CSI; or when the first UCI is SR or HARQ-ACK or first CSI, the second UCI is second CSI, and the third UCI is third CSI, if PUCCH resources for simultaneously transmitting the second CSI and the third CSI are overlapped with PUCCH resources for carrying the SR or HARQ-ACK or the first CSI and priorities of the second CSI and the third CSI are the same, determining that a predetermined one or any one of the second CSI and the third CSI is dropped.

* * * * *